(12) United States Patent
Saji et al.

(10) Patent No.: US 11,171,480 B2
(45) Date of Patent: Nov. 9, 2021

(54) SWITCHING POWER SUPPLY DEVICE AND SEMICONDUCTOR DEVICE

(71) Applicant: PANASONIC INTELLECTUAL PROPERTY MANAGEMENT CO., LTD., Osaka (JP)

(72) Inventors: Takashi Saji, Shiga (JP); Tomoko Usukura, Hyogo (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 359 days.

(21) Appl. No.: 16/279,509

(22) Filed: Feb. 19, 2019

(65) Prior Publication Data

US 2019/0181634 A1    Jun. 13, 2019

Related U.S. Application Data

(63) Continuation of application No. PCT/JP2017/026420, filed on Jul. 21, 2017.

(30) Foreign Application Priority Data

Aug. 30, 2016   (JP) .............................. JP2016-168444

(51) Int. Cl.
*H02H 7/12*   (2006.01)
*H02H 1/00*   (2006.01)
(Continued)

(52) U.S. Cl.
CPC ........ *H02H 7/1213* (2013.01); *H02H 1/0007* (2013.01); *H02M 1/143* (2013.01);
(Continued)

(58) Field of Classification Search
CPC ... H02H 7/1213; H02H 1/0007; H02M 1/143; H02M 1/32; H02M 3/33523;
(Continued)

(56) References Cited

U.S. PATENT DOCUMENTS 6,381,151 B1 * 4/2002 Jang ........................ H02M 1/32
                                                        363/131
2008/0259659 A1 * 10/2008 Choi ........................ H02M 1/32
                                                        363/50
(Continued)

FOREIGN PATENT DOCUMENTS

JP    2005-080336 A    3/2005
JP    2009-100498 A    5/2009
(Continued)

OTHER PUBLICATIONS

International Search Report and Written Opinion issued in International Patent Application No. PCT/JP2017/026420, dated Aug. 22, 2017; with partial English translation.

*Primary Examiner* — Thienvu V Tran
*Assistant Examiner* — Bart Iliya
(74) *Attorney, Agent, or Firm* — McDermott Will and Emery LLP

(57) ABSTRACT

In a switching power supply device including an overload protection circuit, when a load state turns into an overload state due to a decrease in an input voltage, an overload protection signal is activated in response to activation of an overload detection signal, and the overload protection signal is deactivated when an input low voltage detection signal is in an inactive state.

14 Claims, 18 Drawing Sheets

(51) Int. Cl.
*H02M 1/14* (2006.01)
*H02M 3/335* (2006.01)
*H02M 1/32* (2007.01)
*H02M 1/00* (2006.01)

(52) U.S. Cl.
CPC ......... *H02M 1/32* (2013.01); *H02M 3/33523* (2013.01); *H02M 1/0009* (2021.05); *H02M 1/0032* (2021.05); *H02M 1/325* (2021.05)

(58) Field of Classification Search
CPC ... H02M 2001/009; H02M 2001/0032; H02M 2001/325
See application file for complete search history.

(56) References Cited

U.S. PATENT DOCUMENTS

| | | | |
|---|---|---|---|
| 2009/0097284 A1 | 4/2009 | Jiang et al. | |
| 2009/0097484 A1 | 4/2009 | Jiang et al. | |
| 2009/0103338 A1 | 4/2009 | Nakamura | |
| 2011/0148319 A1* | 6/2011 | Terazawa | H05B 45/37 315/291 |

FOREIGN PATENT DOCUMENTS

| | | |
|---|---|---|
| JP | 2009-100591 A | 5/2009 |
| JP | 2012-191735 A | 10/2012 |
| WO | 2011/158282 A1 | 12/2011 |

* cited by examiner

LOW-VOLTAGE DETECTION CIRCUIT 110

OVERLOAD PROTECTION CIRCUIT 120a

RETURN DELAY CIRCUIT 180

SWITCHING POWER SUPPLY DEVICE AND SEMICONDUCTOR DEVICE

CROSS REFERENCE TO RELATED APPLICATIONS

This application is a U.S. continuation application of PCT International Patent Application Number PCT/JP2017/026420 filed on Jul. 21, 2017, claiming the benefit of priority of Japanese Patent Application Number 2016-168444 filed on Aug. 30, 2016, the entire contents of which are hereby incorporated by reference.

BACKGROUND

1. Technical Field

The present disclosure relates to a switching power supply device including an overload protection function for protecting a switching power supply device or an electronic device when a load is abnormal, and a semiconductor device constituting the switching power supply device.

2. Description of the Related Art

A switching power supply device including an overload protection function has heretofore been known (e.g., see Japanese Unexamined Patent Application Publication No. 2009-100591).

In the switching power supply device of the related art discussed in Japanese Unexamined Patent Application Publication No. 2009-100591, when an input voltage is lowered, a switching operation is interrupted regardless of a load state. Accordingly, even when there would otherwise be no need to interrupt the switching operation (e.g., when an instantaneous drop, i.e., a drop for a short period of time, in the input voltage occurs in a light load state), the switching operation can be interrupted. This may have an adverse effect on the load.

Therefore, the present disclosure has been made in view of the above-described problem, and the present disclosure is directed to providing a switching power supply device and a semiconductor device including an overload protection function that operates more appropriately than in the related art.

SUMMARY

A switching power supply device of the present disclosure includes: an energy conversion circuit that receives an input voltage, the input voltage being a DC input voltage; an output rectifying and smoothing circuit that rectifies and smoothes a voltage output from the energy conversion circuit and outputs an output voltage to a load; a switching element that is connected to the energy conversion circuit and switches the input voltage; a switching control circuit that controls switching of the switching element; and an output state detection circuit that generates an output state signal indicating a load state of the load with respect to power output from the energy conversion circuit. The switching control circuit includes: an overload detection circuit that receives the output state signal and generates an overload detection signal, the overload detection signal being activated when the load state is an overload state; an overload protection circuit that generates an overload protection signal in response to activation of the overload detection signal, the overload protection signal being activated when a switching operation of the switching element is interrupted; and an input low-voltage detection circuit that generates an input low voltage detection signal, the input low voltage detection signal being activated when the input voltage has a voltage value lower than a predetermined value, when the load state turns into the overload state due to a decrease in the input voltage, the overload protection signal is activated in response to activation of the overload detection signal, and the overload protection signal is deactivated when the input low voltage detection signal is in an inactive state.

A switching power supply device of the present disclosure includes: an input rectifying and smoothing circuit that rectifies and smoothes an AC voltage from an AC power supply, and outputs an input voltage, the input voltage being a DC input voltage; an energy conversion circuit that receives the input voltage; an output rectifying and smoothing circuit that rectifies and smoothes a voltage output from the energy conversion circuit, and outputs an output voltage to a load; a switching element that is connected to the energy conversion circuit and switches the input voltage; a switching control circuit that controls switching of the switching element; and an output state detection circuit that generates an output state signal indicating a load state of the load with respect to power output from the energy conversion circuit. The switching control circuit includes: an overload detection circuit that receives the output state signal and generates an overload detection signal, the overload detection signal being activated when the load state is an overload state; an overload protection circuit that generates an overload protection signal in response to activation of the overload detection signal, the overload protection signal being activated when a switching operation of the switching element is interrupted; and an input low-voltage detection circuit that generates an input low voltage detection signal, the input low voltage detection signal being activated when the AC voltage has a voltage value lower than a predetermined value, when the load state turns into the overload state due to a decrease in the input voltage, the overload protection signal is activated in response to activation of the overload detection signal, and the overload protection signal is deactivated when the input low voltage detection signal is in an inactive state.

A semiconductor device according to one aspect of the present disclosure has a configuration in which the above-described switching control circuit is formed as an integrated circuit on a semiconductor substrate in the above-described switching power supply device.

As described above, according to one aspect of the present disclosure, it is possible to provide a switching power supply device and a semiconductor device including an overload protection function that operates more appropriately than in the related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS (Circumstances Leading to Attainment of One Aspect of the Present Disclosure)

A switching power supply device is widely used for electronic devices, such as home electric appliances and office equipment, so as to achieve an improvement in power conversion efficiency, miniaturization, and the like. The switching power supply device controls an output voltage or the like using a switching operation performed by a semiconductor switching element or the like, and supplies a load with power.

In such a switching power supply device, if a load abnormality, such as short-circuit fault in a load, occurs, there is a need to sufficiently reduce power supply to the load from an input so as to protect the load and the switching power supply device. Accordingly, many switching power supply devices are provided with an overload protection function for detecting an overload state in the switching power supply device and interrupting a switching operation.

Examples of the overload protection function include a latch-type overload protection function in which once a protection operation is activated, a protected state is held until a predetermined reset signal is input due to an input cut-off or the like, and a self-reset-type overload protection function in which the protected state is automatically released after a lapse of a predetermined time so that the state can be returned to a normal operation when the state is recovered to the normal state from an overload state.

Such an overload protection circuit is required to perform an appropriate operation to prevent an adverse effect on the load or the switching power supply device even when the power supply is interrupted, or when an instantaneous drop (including instantaneous interruption and instantaneous stop) during which an input voltage drops for a short period of time.

Figure 17:
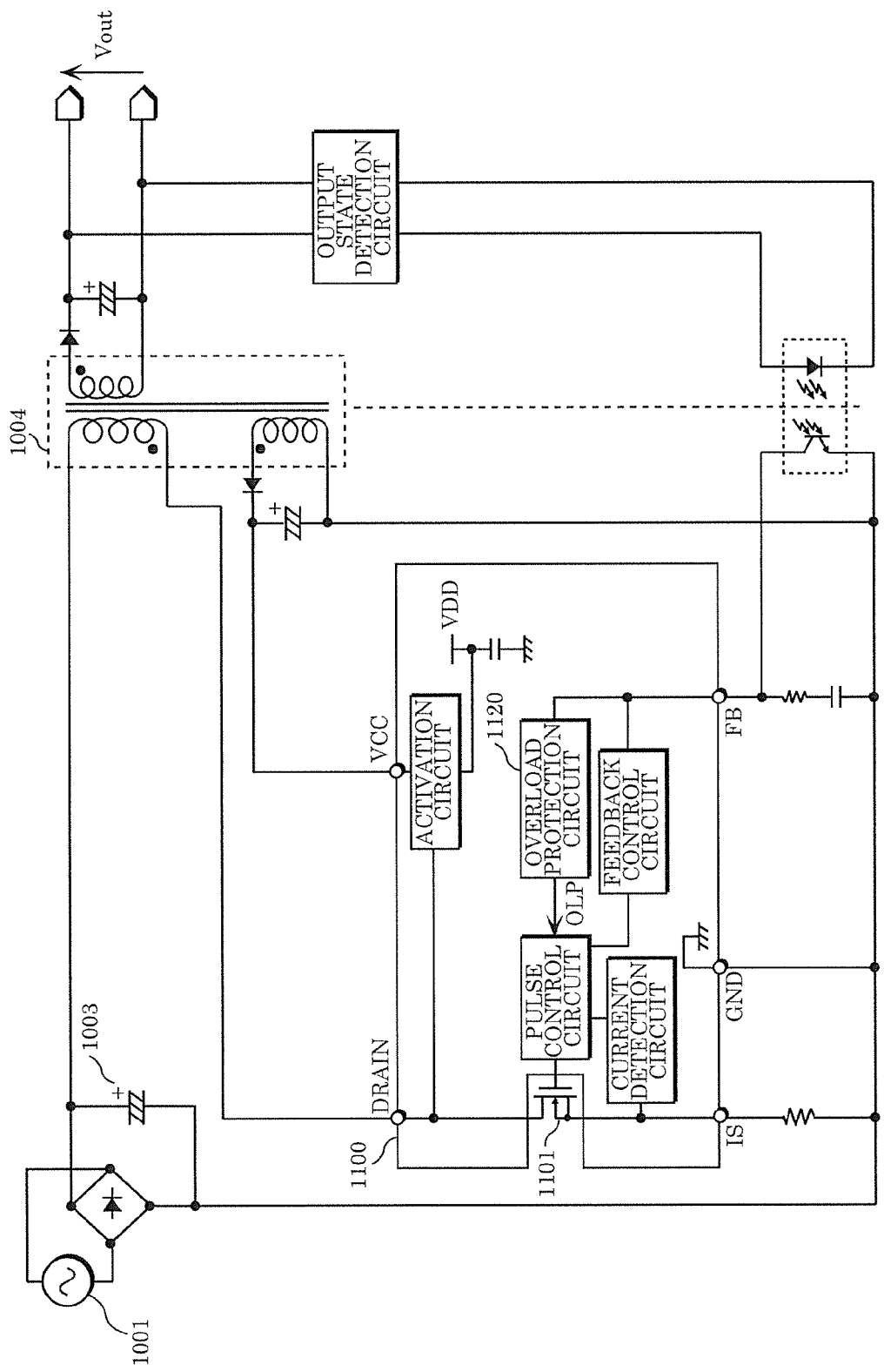
FIG. 17 is a circuit diagram illustrating a configuration example of a switching power supply device which does not include an input low-voltage detection circuit of a related art.
Figure 18:
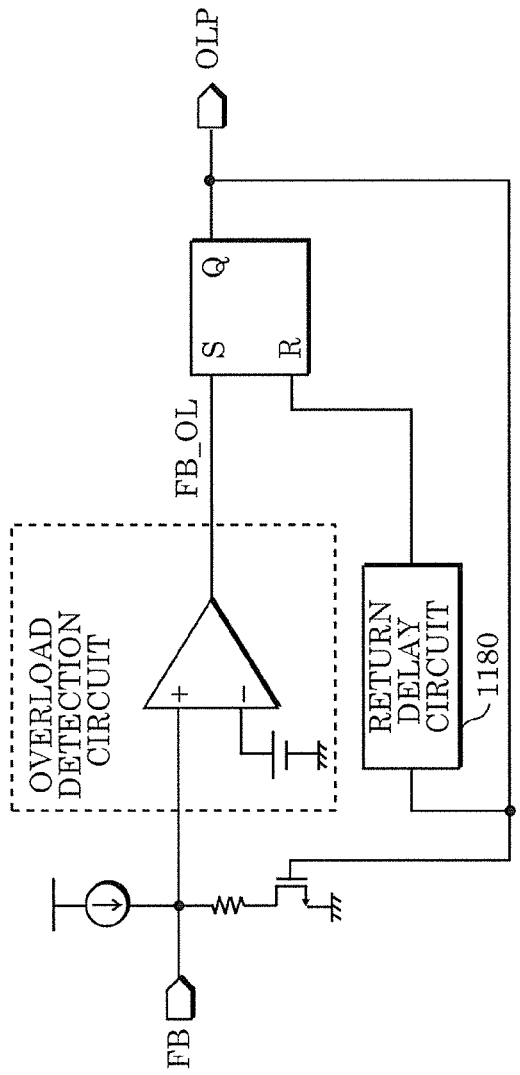
FIG. 18 is a circuit diagram illustrating a configuration example of a return delay circuit of the related art.
Figure 19:
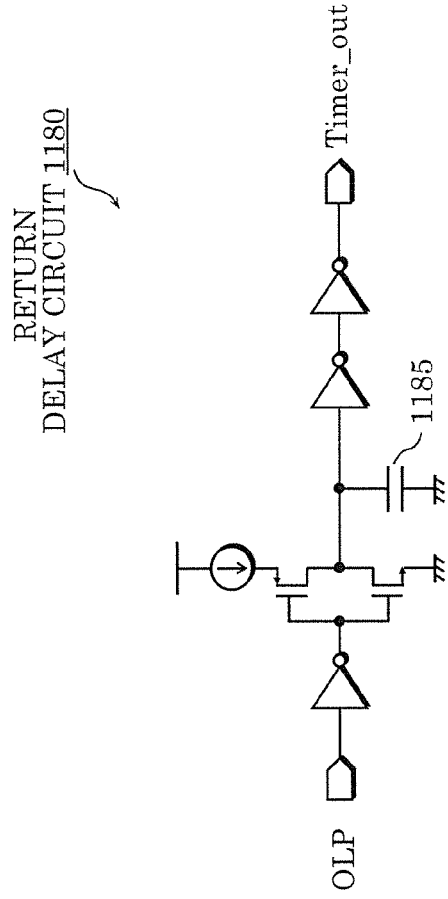
FIG. 19 is a circuit diagram illustrating a configuration example of an overload protection circuit of the related art.

FIG. 17 is a circuit diagram illustrating an example of a switching power supply device of the related art. The switching power supply device illustrated in FIG. 17 includes overload protection circuit 1120 illustrated in FIG. 18 within switching control circuit 1100. The switching power supply device detects a load abnormality based on an increase in FB-terminal voltage, and shifts to an overload protection operation. FIG. 19 is a circuit diagram illustrating an example of return delay circuit 1180 of the related art.

Figure 20:
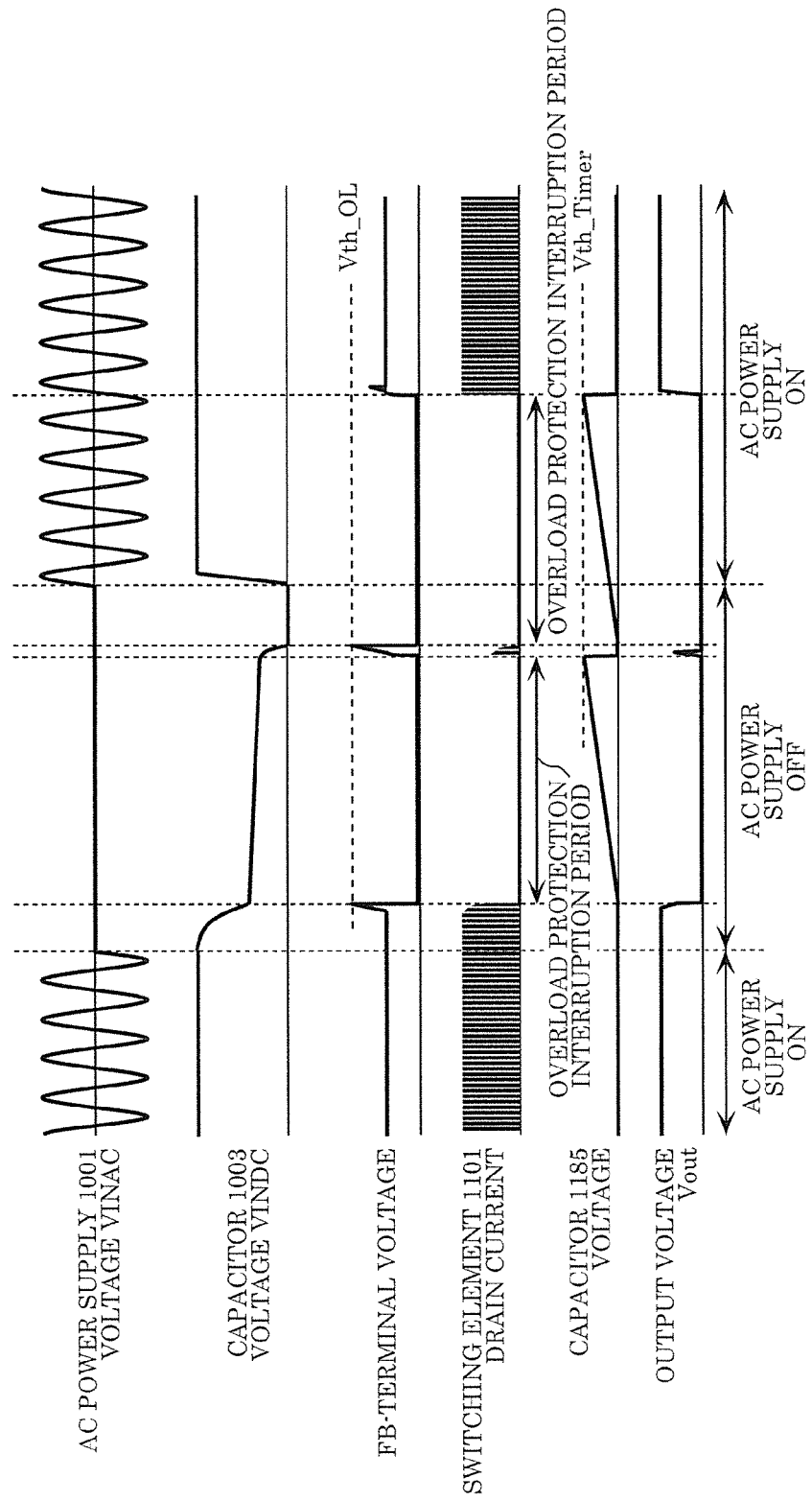
FIG. 20 is a timing diagram illustrating a case where overload protection function is activated during an instantaneous drop in the switching power supply device that does not include the input low-voltage detection circuit of the related art.

FIG. 20 is a timing diagram illustrating a problem caused during an instantaneous drop in the switching power supply device of the related art when the self-reset-type overload protection function is used. During the switching power supply device is operating, the overload protection function is activated when an AC power supply is turned off for a short time. Since the self-reset-type overload protection function is used, an overload protection interruption period ends after a lapse of a predetermined delay time defined by return delay circuit 1180, and the switching operation is resumed. At this time, if electric charges remain in smoothing capacitor 1003, output voltage Vout is generated through transformer 1004. However, since the AC power supply is turned off, an input DC voltage is low, the overload protection function is activated again and output voltage Vout decreases immediately. Such short-pulse-like output voltage Vout that does not reach a prescribed output voltage may cause a malfunction in an electronic device connected to the load. For this reason, the switching power supply device may not be returned during a period in which the AC power supply is off. Further, since the AC power supply is returned during a period in which the overload protection function is activated again, the switching operation cannot be resumed during a predetermined delay time defined by return delay circuit 1180. Accordingly, there is also a problem that the return of the switching power supply device is delayed.

The related art to solve these problems is discussed in, for example Japanese Unexamined Patent Application Publication No. 2009-100591. A switching power supply device discussed in Japanese Unexamined Patent Application Publication No. 2009-100591 includes an input low-voltage detection circuit (described as a low-input protection circuit in Japanese Unexamined Patent Application Publication No. 2009-100591), and when an input voltage is less than a threshold voltage and the period in which the input voltage is less than the threshold voltage reaches a predetermined delay time, a switching operation is interrupted.

Accordingly, the switching power supply device discussed in Japanese Unexamined Patent Application Publication No. 2009-100591 interrupts the switching operation before the overload protection function is activated when the AC power supply is turned off, so that the above-described problem with the self-reset of the overload protection function does not occur.

However, in the switching power supply device of the related art as discussed in Japanese Unexamined Patent Application Publication No. 2009-100591, if the input voltage decreases regardless of the load state, the switching operation is interrupted.

Figure 21:
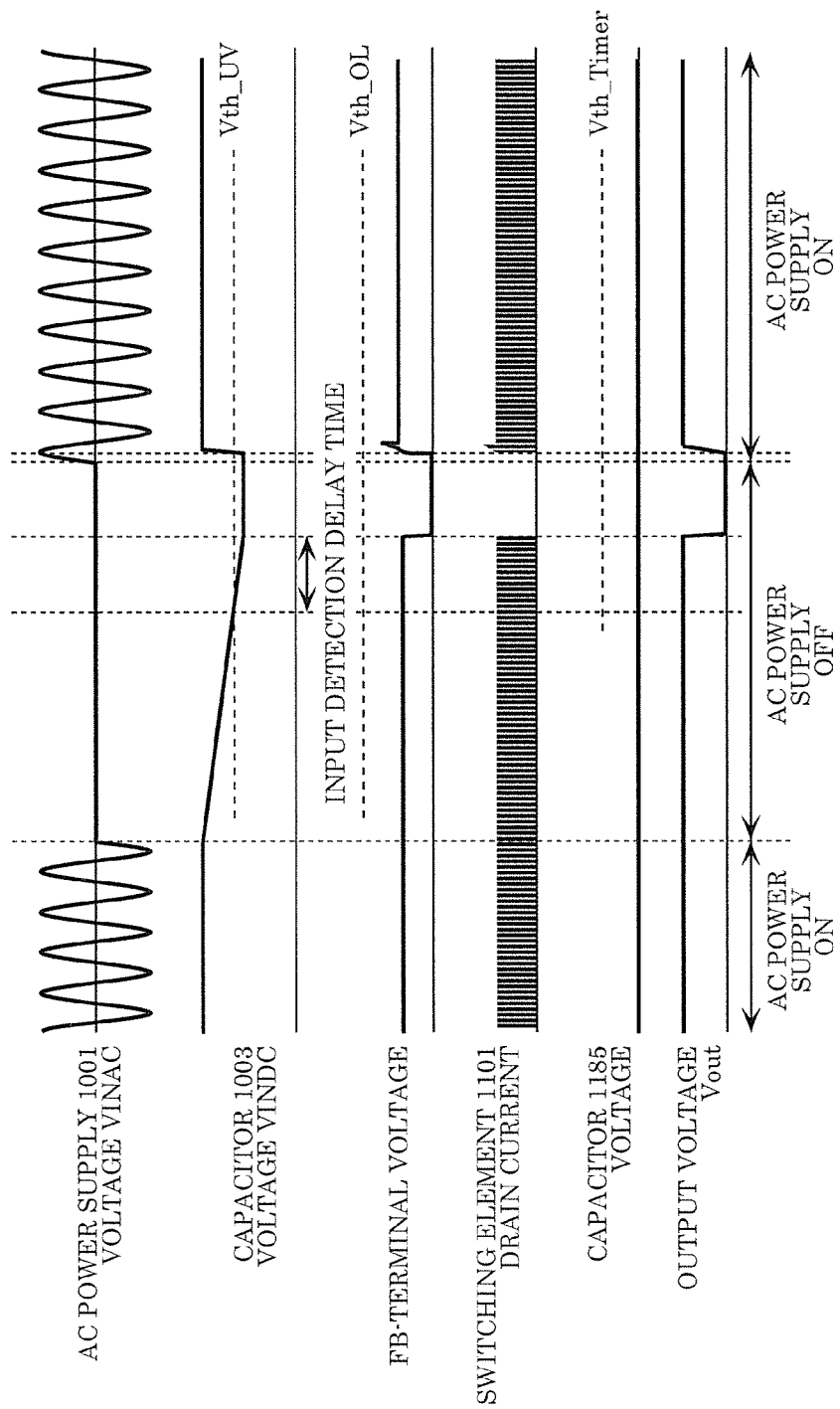
FIG. 21 is a timing diagram illustrating a case where an input low voltage is detected during an instantaneous drop in the switching power supply device including the input low-voltage detection circuit of the related art.

FIG. 21 is a timing diagram illustrating a problem caused during an instantaneous drop in the switching power supply device of the related art as discussed in Japanese Unexamined Patent Application Publication No. 2009-100591. Since the load is lighter than that illustrated in FIG. 20, the instantaneous drop condition in which output voltage Vout can be maintained if the switching operation is continued is set. However, when the input voltage is less than threshold voltage Vth_UV and the period in which the input voltage is less than threshold voltage Vth_UV reaches a delay time, the switching operation is interrupted and output voltage Vout decreases. After that, as the input voltage increases, the switching operation is resumed and output voltage Vout increases. A decrease in short-pulse-like output voltage Vout may cause a malfunction in an electronic device connected to the load.

Further, since the switching operation is interrupted during a decrease in the input voltage when the AC power supply is off, electric charges are likely to remain in smoothing capacitor 1003 and the high-voltage state is maintained for a long period of time, which causes a problem with the convenience during maintenance.

Furthermore, there is a need to prevent erroneous detection by, for example, providing a long delay time, so as not to interrupt the switching operation by detecting an input low voltage during the normal operation, which leads to an increase in cost.

In order to solve the above problems, a switching power supply device according to one aspect of the present disclosure includes: an energy conversion circuit that receives an input voltage, the input voltage being a DC input voltage; an output rectifying and smoothing circuit that rectifies and smoothes a voltage output from the energy conversion circuit and outputs an output voltage to a load; a switching element that is connected to the energy conversion circuit and switches the input voltage; a switching control circuit that controls switching of the switching element; and an output state detection circuit that generates an output state signal indicating a load state of the load with respect to power output from the energy conversion circuit. The switching control circuit includes: an overload detection circuit that receives the output state signal and generates an overload detection signal, the overload detection signal being activated when the load state is an overload state; an overload protection circuit that generates an overload protection signal in response to activation of the overload detection signal, the overload protection signal being activated when a switching operation of the switching element is interrupted; and an input low-voltage detection circuit that generates an input low voltage detection signal, the input low voltage detection signal being activated when the input voltage has a voltage value lower than a predetermined value, when the load state turns into the overload state due to a decrease in the input voltage, the overload protection signal is activated in response to activation of the overload detection signal, and the overload protection signal is deactivated when the input low voltage detection signal is in an inactive state.

Thus, an appropriate overload protection operation can be performed also when the power supply is interrupted, and when an instantaneous drop during which the input voltage drops for a short period of time occurs.

Moreover, a switching power supply device according to one aspect of the present disclosure includes: an input rectifying and smoothing circuit that rectifies and smoothes an AC voltage from an AC power supply, and outputs an input voltage, the input voltage being a DC input voltage; an energy conversion circuit that receives the input voltage; an output rectifying and smoothing circuit that rectifies and smoothes a voltage output from the energy conversion circuit, and outputs an output voltage to a load; a switching element that is connected to the energy conversion circuit and switches the input voltage; a switching control circuit that controls switching of the switching element; and an output state detection circuit that generates an output state signal indicating a load state of the load with respect to power output from the energy conversion circuit. The switching control circuit includes: an overload detection circuit that receives the output state signal and generates an overload detection signal, the overload detection signal being activated when the load state is an overload state; an overload protection circuit that generates an overload protection signal in response to activation of the overload detection signal, the overload protection signal being activated when a switching operation of the switching element is interrupted; and an input low-voltage detection circuit that generates an input low voltage detection signal, the input low voltage detection signal being activated when the AC voltage has a voltage value lower than a predetermined value, when the load state turns into the overload state due to a decrease in the input voltage, the overload protection signal is activated in response to activation of the overload detection signal, and the overload protection signal is deactivated when the input low voltage detection signal is in an inactive state.

Thus, since the input low voltage can be detected from the AC voltage of the AC power supply, the power consumption can be reduced and turning-off of the AC power supply can be detected more quickly.

For example, the overload protection circuit may include a timer circuit that measures a first time duration, the overload protection signal may be continuously active during the first time duration from the activation of the overload detection signal, and the overload protection signal may be deactivated after a lapse of the first time duration from the activation of the overload detection signal and when the input low voltage detection signal is in the inactive state.

Thus, an appropriate overload protection operation can be performed also when the power supply is interrupted, and when an instantaneous drop during which the input voltage drops for a short period of time occurs, even if the self-reset-type overload protection function is used.

For example, when the input low voltage detection signal is activated, the timer circuit may change the first time duration to a second time duration shorter than the first time duration.

Thus, since the delay time varies depending on the input low voltage detection state, the overload protection function is released immediately after the AC power supply is returned even when the overload protection function is activated due to an instantaneous drop or the like, and thus a delay in returning of the switching power supply device can be reduced.

For example, the overload protection circuit may include a latch circuit that stores an activation state of the overload detection signal, and the latch circuit may be set when the overload detection signal is activated, and may activate the overload protection signal, and the latch circuit may be reset when the input low voltage detection signal is deactivated, and may deactivate the overload protection signal.

Thus, it is possible to prevent such a problem that the overload protection function is released immediately after the AC power supply is returned and the switching power supply device cannot be returned, even when the latch-type overload protection function is activated due to an instantaneous drop or the like.

For example, a voltage having a voltage value lower than the predetermined value in the input low-voltage detection circuit may be detected based on a voltage at a node between the switching element and the energy conversion circuit.

Thus, the number of terminals dedicated to detecting an input voltage can be reduced.

For example, a current consumption in the input low-voltage detection circuit may be smaller when the overload protection signal is in an inactive state than when the overload protection signal is in an active state.

Thus, the power consumption can be reduced during the normal operation.

Moreover, a switching control circuit in the switching power supply device according to one aspect of the present disclosure is disposed as an integrated circuit on a semiconductor substrate.

Thus, the number of components of the switching power supply device can be drastically reduced, which facilitates a reduction in the size and weight of the switching power supply device, as well as, a reduction in cost.

A switching power supply device and a semiconductor device according to an embodiment of the present disclosure will be described below with reference to the drawings. However, detailed descriptions may be omitted as needed. For example, detailed descriptions of well-known matters or substantially the same components may be omitted. This is because the following description is prevented from being unnecessarily redundant, and a person skilled in the art can easily understand the present disclosure.

The accompanying drawings and the following description are provided for a person skilled in the art to fully understand the present disclosure, and do not intend to limit the subject matter described in claims.

Embodiment 1

A switching power supply device and a semiconductor device according to Embodiment 1 will be described in detail below with reference to FIGS. 1 to 6.

Figure 1:
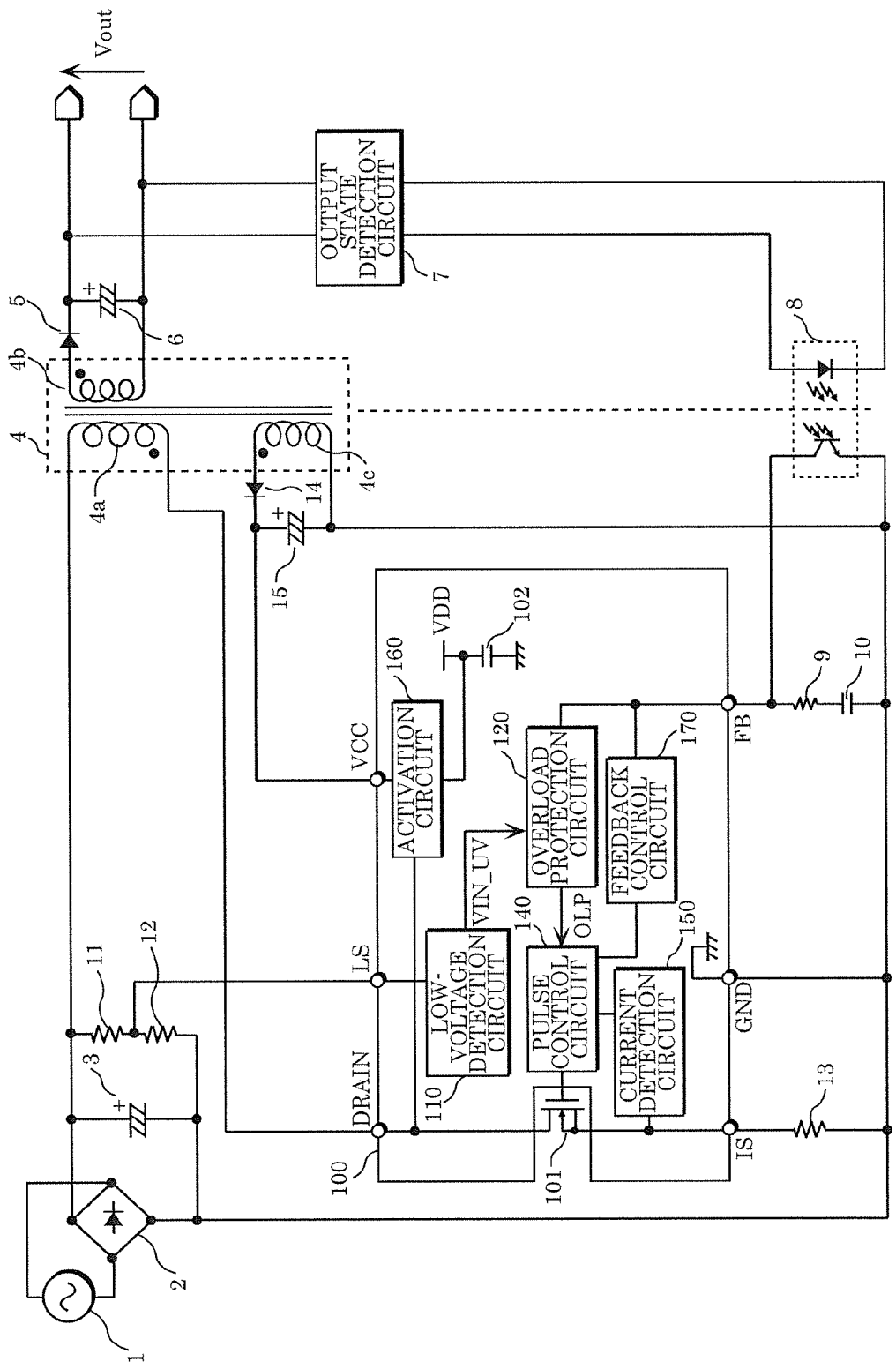
FIG. 1 is a circuit diagram illustrating a configuration example of a switching power supply device according to Embodiment 1.

FIG. 1 is a circuit diagram illustrating a configuration of a switching power supply device including a semiconductor device for switching control according to Embodiment 1.

Referring to FIG. 1, bridge diode 2 for rectifying an AC voltage is connected to AC power supply 1, and smoothing capacitor 3, input voltage detection resistors 11 and 12, and primary winding 4a of transformer 4 for power conversion are connected to bridge diode 2.

Bridge diode 2 and smoothing capacitor 3 provide an input rectifying and smoothing circuit that rectifies and smoothes the AC voltage of AC power supply 1 and outputs a DC input voltage.

Transformer 4 includes primary winding 4a, secondary winding 4b, and auxiliary winding 4c. Primary winding 4a and secondary winding 4b have opposite polarities. This switching power supply device is a flyback type.

Switching element 101 is connected to primary winding 4a through switching control circuit 100. A switching operation for switching element 101 is controlled by changing a voltage signal to be applied to a control electrode (gate) of switching element 101.

Rectifier diode 5 and smoothing capacitor 6 are each connected to secondary winding 4b, and a flyback voltage generated in secondary winding 4b by the switching operation is rectified and smoothed, so that output voltage Vout is generated.

Transformer 4 provides an energy conversion circuit that receives the DC input voltage and outputs the flyback voltage.

Rectifier diode 5 and smoothing capacitor 6 provide an output rectifying and smoothing circuit that rectifies and smoothes the flyback voltage output from the energy conversion circuit and outputs an output voltage to a load.

Switching element 101 is connected to the energy conversion circuit and switches the input voltage.

Switching element 101 and switching control circuit 100 are integrated on a semiconductor substrate and constitute a single semiconductor device. This switching element 101 includes a power MOSFET.

Switching control circuit 100 and switching element 101 need not necessarily be provided on the same semiconductor substrate. For example, an output terminal for outputting a control signal may be provided on a semiconductor substrate on which switching control circuit 100 is disposed, and the output terminal may be connected to the gate of switching element 101 that is disposed on another semiconductor substrate. Switching control circuit 100 and switching element 101 which are disposed on different semiconductor substrates, respectively, may be sealed in a resin package, or may be sealed in different resin packages, respectively.

Switching control circuit 100 controls switching of switching element 101. Switching control circuit 100 includes six terminals as external input/output terminals, excluding a connection terminal to be connected to switching element 101. The six terminals include a DRAIN terminal, a VCC terminal, an FB terminal, an LS terminal, an IS terminal, and a GND terminal. For example, switching control circuit 100 includes smoothing capacitor 102, low-voltage detection circuit 110, overload protection circuit 120, feedback control circuit 170, pulse control circuit 140, current detection circuit 150, and activation circuit 160.

The DRAIN terminal is a terminal to be connected to a node between primary winding 4a of transformer 4 and switching element 101, i.e., the drain of switching element 101.

The VCC terminal is a terminal that connects an output of a rectifying and smoothing circuit, which includes rectifier diode 14 and smoothing capacitor 15 that are connected to auxiliary winding 4c, and activation circuit 160 incorporated in switching control circuit 100. The VCC terminal rectifies and smoothes the flyback voltage generated in auxiliary winding 4c by the switching operation of switching element 101, and supplies power to switching control circuit 100 as control power supply voltage VCC.

The FB terminal is a terminal for inputting a feedback signal (e.g., a current generated by a photocoupler) output from output state detection circuit 7 to feedback control circuit 170 of switching control circuit 100. The FB terminal is also a terminal that is connected to each of an RC circuit, which includes resistor 9 and capacitor 10, and overload protection circuit 120, and that detects an overload state.

The LS terminal is a terminal that connects input voltage detection resistors 11 and 12 and low-voltage detection circuit 110, and detects a decrease in input DC voltage VINDC that is applied to both ends of smoothing capacitor 3.

The IS terminal is a terminal that connects each of switching element 101 and current detection circuit 150 to resistor 13, and detects a current flowing through switching element 101.

The GND terminal is a terminal that connects GND, which is a potential reference of switching control circuit 100, to a low-potential-side terminal of smoothing capacitor 3.

Activation circuit 160 is connected to each of the DRAIN terminal, VCC terminal, smoothing capacitor 102, and circuit internal voltage source VDD of switching control circuit 100. During activation of the switching power supply device, when input DC voltage VINDC is applied to the DRAIN terminal through primary winding 4a of transformer 4, an activation current flows into smoothing capacitors 102 and 15 from the DRAIN terminal through activation circuit 160. When smoothing capacitors 102 and 15 are charged and each of the VDD voltage and the VCC-terminal voltage increases and reaches the activation voltage, activation circuit 160 cuts off the activation current. Further, activation circuit 160 monitors the VCC-terminal voltage to determine whether the switching operation of switching element 101 can be performed. Although not illustrated, an activation/interruption signal is output to pulse control circuit 140 and the like.

Feedback control circuit 170 receives the feedback signal output from output state detection circuit 7 through the FB terminal, sets a switching frequency or a current flowing through switching element 101 so as to stabilize output voltage Vout at a constant voltage, and outputs the set switching frequency or current to pulse control circuit 140.

Current detection circuit 150, which detects a current flowing through switching element 101, receives a voltage signal appearing in resistor 13, which is connected to the IS terminal, compares the voltage signal with a preliminarily set reference voltage, and outputs a turn-off signal of switching element 101 to pulse control circuit 140. The reference voltage for comparison may vary in response to the output signal from feedback control circuit 170 depending on the switching control method.

Low-voltage detection circuit 110 and resistors 11 and 12 provide an input low-voltage detection circuit that generates low voltage detection signal VIN_UV that is activated when the input voltage is a voltage having a voltage value lower than a predetermined value. More specifically, low-voltage detection circuit 110, which detects a decrease in input DC voltage VINDC, receives a voltage divided by input voltage detection resistors 11 and 12, compares the divided voltage with the preliminarily set reference voltage, and outputs input low voltage detection signal VIN_UV to overload protection circuit 120.

Figure 2:
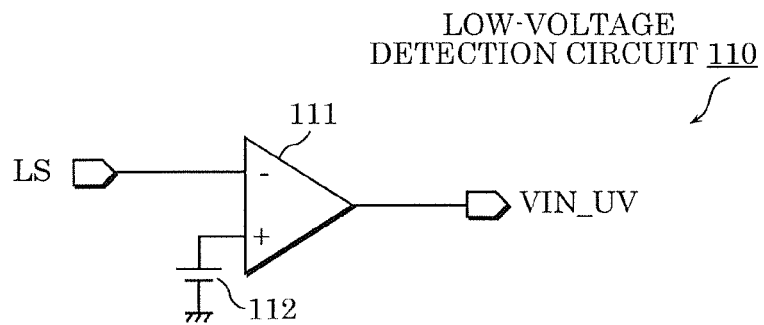
FIG. 2 is a circuit diagram illustrating a configuration of a low-voltage detection circuit according to Embodiment 1.

FIG. 2 is a circuit diagram illustrating a configuration of low-voltage detection circuit 110 according to Embodiment 1. Low-voltage detection circuit 110 includes comparator 111 and reference voltage source 112, and input low voltage detection signal VIN_UV is brought into a high level and activated when the LS-terminal voltage is lower than threshold voltage Vth_UV set by reference voltage source 112. To prevent erroneous detection and stabilize the operation, reference voltage source 112 may have a hysteresis.

Overload protection circuit 120 generates overload protection signal OLP that is activated when the switching operation of switching element 101 is interrupted by activating overload detection signal FB_OL to be described below. More specifically, overload protection circuit 120 monitors the FB-terminal voltage to detect the overload state of the switching power supply device, and upon detecting the overload state, overload protection circuit 120 outputs overload protection signal OLP to pulse control circuit 140 to interrupt the switching operation of switching element 101. Further, in a state where input low voltage detection signal VIN_UV is input and an input low voltage is detected, overload protection circuit 120 performs control to prevent the overload protection function from being released.

Figure 3:
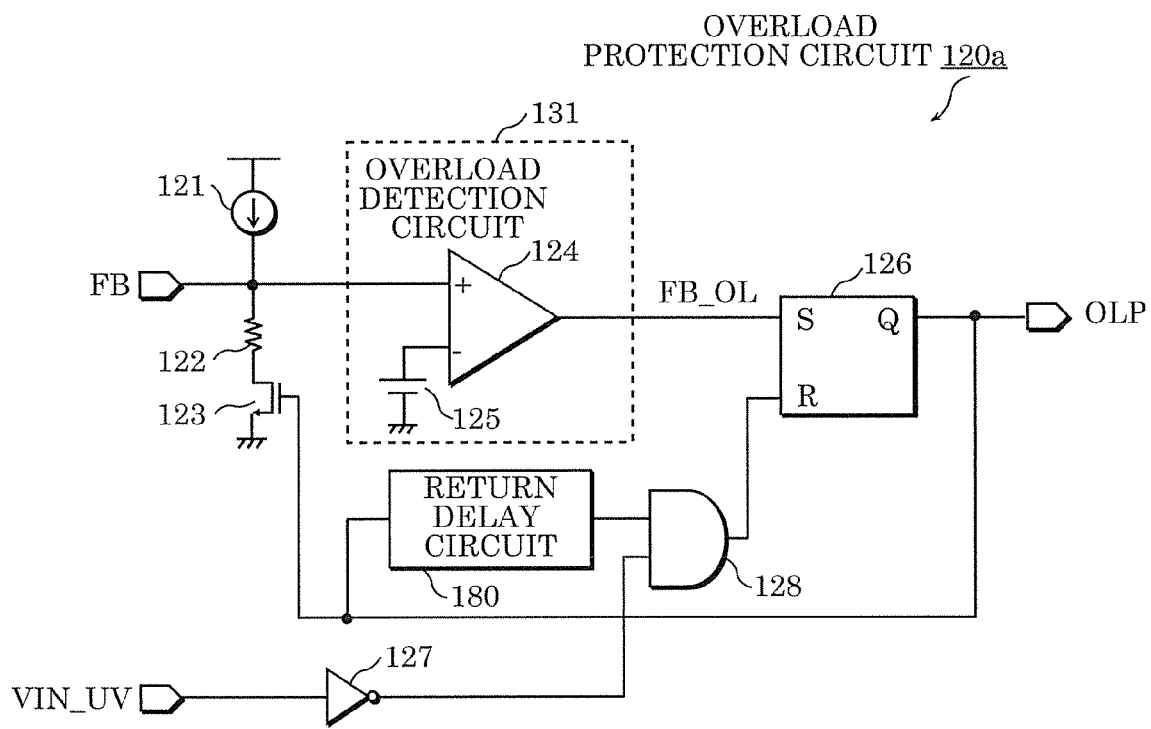
FIG. 3 is a circuit diagram illustrating a configuration of an overload protection circuit according to Embodiment 1.

FIG. 3 is a circuit diagram illustrating overload protection circuit 120a as a configuration example of overload protection circuit 120 according to Embodiment 1. Overload protection circuit 120a is a self-reset-type overload protection circuit, and includes constant current source 121, resistor 122, N-type MOSFET 123, comparator 124, reference voltage source 125, RS flip-flop circuit 126, inverter circuit 127, AND circuit 128, and return delay circuit 180. Elements are connected to overload protection circuit 120a as illustrated in FIG. 3. In addition, photocoupler 8 and the RC circuit, which includes resistor 9 and capacitor 10, are externally connected to the FB terminal.

When the switching power supply device is in the overload state, output state detection circuit 7 decreases the current to flow into photocoupler 8, so that a constant current flowing from constant current source 121 flows into the RC circuit connected to the FB terminal, and the FB-terminal voltage increases. Overload detection circuit 131 generates overload detection signal FB_OL that is activated when an output state signal (i.e., feedback signal) is input and the load is in an overload state. This overload detection circuit 131 includes reference voltage source 125 and comparator 124. When the FB-terminal voltage is higher than threshold voltage Vth_OL set by reference voltage source 125, overload detection circuit 131 inverts overload detection signal FB_OL, which is an output from comparator 124, to the high level, and outputs overload detection signal FB_OL to set terminal (S) of RS flip-flop circuit 126. As a result, overload protection signal OLP is inverted to the high level and activated, and is then output to pulse control circuit 140 so as to interrupt the switching operation of switching element 101. The constant current of constant current source 121 and the RC circuit provide a delay time from a time when the overload state is detected to a time when the switching operation is interrupted by the overload protection detection function.

RS flip-flop circuit 126 provides a latch circuit that stores an active state of overload detection signal FB_OL.

When the overload protection function is activated, overload protection signal OLP is activated to turn on N-type MOSFET 123, and a discharge current is caused to flow from the RC circuit, which is connected to the FB terminal, through resistor 122, to decrease the FB-terminal voltage. Further, overload protection signal OLP is activated so that return delay circuit 180 starts operation, and a high-level signal is output to AND circuit 128 after a lapse of a predetermined delay time. This AND circuit 128 also receives a signal obtained by inverting input low voltage detection signal VIN_UV by inverter circuit 127. When input low voltage detection signal VIN_UV is at a low level, i.e., when input low voltage detection signal VIN_UV is in an inactive state, the output from AND circuit 128 is inverted to the high level and is input to a reset terminal (R) of RS flip-flop circuit 126, and overload protection signal OLP is inverted to the low level and is deactivated, so that the overload protection operation is terminated. Accordingly, since the protected state is released in a predetermined delay time after the overload protection function is activated, the overload protection function is a self-reset type.

Figure 4:
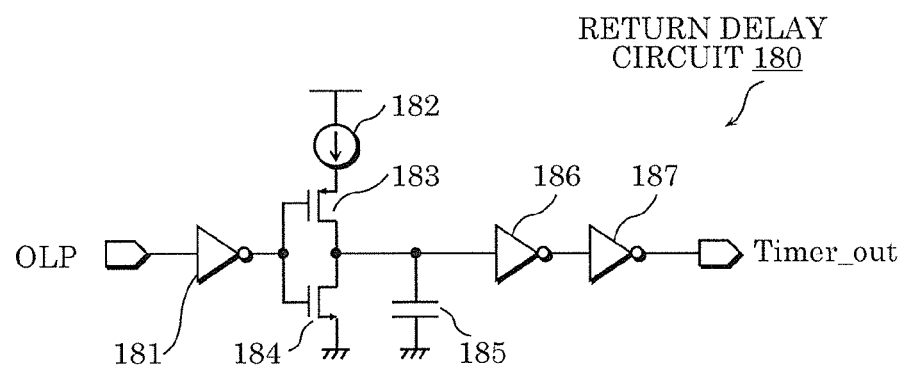
FIG. 4 is a circuit diagram illustrating a configuration of a return delay circuit according to Embodiment 1.

FIG. 4 is a circuit diagram illustrating a configuration of return delay circuit 180 according to Embodiment 1. Return delay circuit 180 includes inverter circuits 181, 186, and 187, constant current source 182, P-type MOSFET 183, N-type MOSFET 184, and capacitor 185. This return delay circuit 180 provides a timer circuit that measures a first time duration. When overload protection signal OLP, which is an input signal, is inverted to the high level, after a lapse of a predetermined delay time, constant current source 182 and capacitor 185 invert delay signal Timer_out to the high level, and output a signal for releasing the overload protection function.

Pulse control circuit 140 is a circuit for controlling the switching operation of switching element 101, and determines the switching operation, interruption, turn-on timing, and turn-off timing based on signals the like received from overload protection circuit 120, feedback control circuit 170, and current detection circuit 150. Pulse control circuit 140 includes a turn-on signal generation circuit, such as an oscillator for generating a periodic turn-on timing, and a drive circuit for driving switching element 101.

Output state detection circuit 7 generates an output state signal (i.e., feedback signal) indicating the load state of a load on the power output from the energy conversion circuit. More specifically, output state detection circuit 7 includes a detection resistor, a Zener diode, and a shunt regulator, detects the voltage level of output voltage Vout, and outputs the feedback signal to switching control circuit 100 through photocoupler 8 so that output voltage Vout is stabilized at a predetermined voltage. To detect output voltage Vout, the flyback voltage generated in auxiliary winding 4c may be used, or a VCC voltage obtained after rectification/smoothing is performed by rectifier diode 14 and smoothing capacitor 15.

The operation of the switching power supply device and the semiconductor device for switching control that are illustrated in FIG. 1 and configured as described above will be described.

When AC power supply 1, such as a commercial power supply, is input, bridge diode 2 and smoothing capacitor 3 rectify and smooth AC power supply 1 and convert AC power supply 1 into input DC voltage VINDC. This input DC voltage VINDC is applied to the DRAIN terminal through primary winding 4a of transformer 4, and the activation current flows into smoothing capacitor 15, which is connected to the VCC terminal, from the DRAIN terminal through activation circuit 160 in switching control circuit 100. When the VCC-terminal voltage increases and reaches the activation voltage set by activation circuit 160, the switching control of switching element 101 is started.

During the activation, output voltage Vout is low and no current flows from output state detection circuit 7 to photocoupler 8, and thus the switching control is performed in the overload state. Specifically, since the FB-terminal voltage is increased by constant current source 121, resistor 9, and capacitor 10, the capacitance value of capacitor 10 is set so as to prevent the overload protection function from being activated at a voltage higher than threshold voltage Vth_OL set by reference voltage source 125. Since the switching operation in the overload state requires a high frequency and a high current peak, which places a burden on switching element 101 and the like, a soft-start function for gradually increasing the frequency and current peak only in the activation state may be provided.

Once switching element 101 is turned on, a current flows through switching element 101 and resistor 13, and the voltage signal corresponding to the magnitude of the current is input to current detection circuit 150. When the voltage becomes equal to or higher than the preliminarily set reference voltage, switching element 101 is turned off.

When switching element 101 is turned off, energy stored when the current flows to a primary side of transformer 4 during the ON period of switching element 101 is transmitted to a secondary side.

As the switching operation as described above is repeated, output voltage Vout increases. At this time, when output voltage Vout becomes equal to or higher than the predetermined voltage set by output state detection circuit 7, output state detection circuit 7 and photocoupler 8 control the current to flow from the FB terminal of switching control circuit 100 as a feedback signal. Depending on the magnitude of the flow-out current, feedback control circuit 170 adjusts the current flowing through switching element 101, or the switching frequency.

Specifically, in a light load state in which a small amount of current is supplied to the load connected to the switching power supply device, the current flowing through switching element 101, or the switching frequency is set to a low level, while in a heavy load state, the current flowing through switching element 101, or the switching frequency is set to a high level. In this manner, switching control circuit 100 controls output voltage Vout to be stabilized at the predetermined voltage, while changing the current flowing through switching element 101, or the frequency, depending on the power to be supplied to the load connected to the switching power supply device.

The overload protection operation will now be described. In the overload state, the supply of energy by the switching operation is insufficient and output voltage Vout decreases, so that no current flows from output state detection circuit 7 to photocoupler 8, like in the activation state, and the FB-terminal voltage is increased by constant current source 121, resistor 9, and capacitor 10 in overload protection circuit 120a. When the overload state continues until the FB-terminal voltage exceeds threshold voltage Vth_OL set by reference voltage source 125, overload protection signal OLP is inverted to the high level and activated. When overload protection signal OLP is activated, the switching operation of switching element 101 is interrupted through pulse control circuit 140, and the overload protection operation is started. Further, N-type MOSFET 123 is turned on to decrease the FB-terminal voltage, ready for re-activation.

After the overload protection function is activated, when the input voltage is normal, overload protection signal OLP is inverted to the low level and deactivated after a lapse of a predetermined delay time set by return delay circuit 180, and then the overload protection operation is terminated. When the VCC-terminal voltage decreases, the switching control of switching element 101 is resumed after the voltage increases to the activation voltage, so that the re-activation state is obtained. When the overload state continues, the overload protection function is activated again, and the interruption and the re-activation are repeated.

Figure 5:
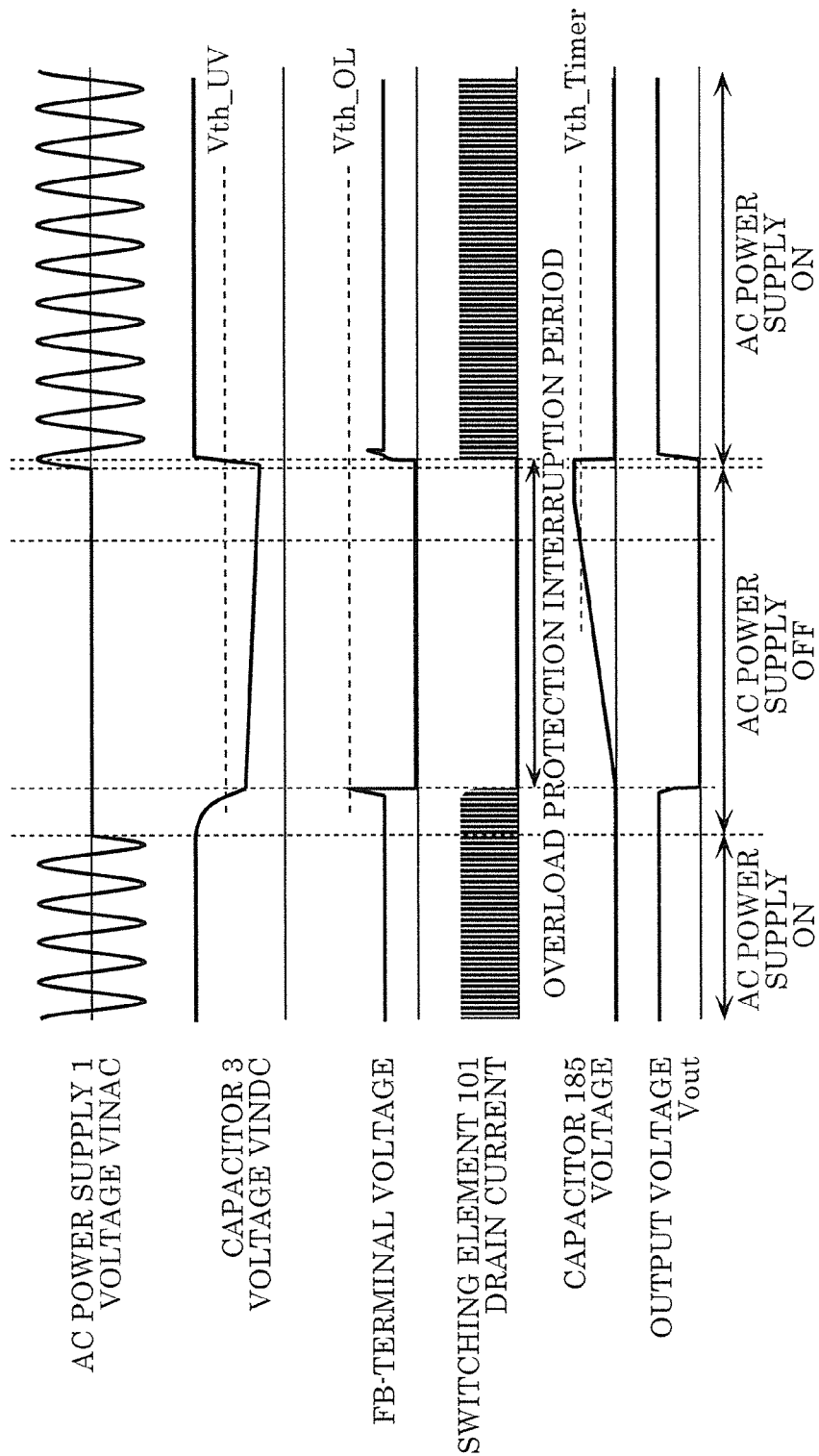
FIG. 5 is a timing diagram illustrating a case where overload protection function is activated during an instantaneous drop in the switching power supply device according to Embodiment 1.

Next, the operation of the switching power supply device according to Embodiment 1 when AC power supply 1 is turned off will be described with reference to a timing diagram illustrated in FIG. 5.

When AC power supply 1 is turned off, input DC voltage VINDC, which is a voltage between terminals of smoothing capacitor 3, decreases, and energy that can be supplied by the switching operation also decreases. As input DC voltage VINDC decreases, the supply of energy becomes insufficient and the overload state occurs, so that the FB-terminal voltage increases and the overload protection function is activated.

When the overload protection function is activated, the switching operation is interrupted, and charging of capacitor 185 in return delay circuit 180 is started. After a lapse of a predetermined delay time, the voltage of capacitor 185 exceeds threshold voltage Vth_Timer that causes inversion of the output from inverter circuit 186, and output signal Timer_out of return delay circuit 180 is inverted to the high level. On the other hand, since input DC voltage VINDC is lower than threshold voltage Vth_UV and input low voltage detection signal VIN_UV is in the active state, the output of AND circuit 128 is maintained at the low level and thus RS flip-flop circuit 126 is not reset. Accordingly, overload protection signal OLP is maintained in the active state and the overload protection interruption period is extended until input low voltage detection signal VIN_UV is inverted to the low level and deactivated.

When AC power supply 1 is returned, input DC voltage VINDC increases and input low voltage detection signal VIN_UV is inverted to the low level and deactivated. Since the reset signal is input to RS flip-flop circuit 126 and overload protection signal OLP is inverted to the low level and deactivated, the FB-terminal voltage increases and the switching operation is resumed.

Specifically, the overload protection operation is started regardless of input low voltage detection signal VIN_UV, while the overload protection operation is released only when input low voltage detection signal VIN_UV is in the inactive state.

If the OFF period of AC power supply 1 is long, the VDD voltage decreases, and thus RS flip-flop circuit 126 cannot hold the output signal, the overload protection function may be released regardless of input low voltage detection signal VIN_UV, and then when the VDD voltage or VCC-terminal voltage reaches the activation voltage by the return of AC power supply 1, the switching operation may be resumed.

Figure 6:
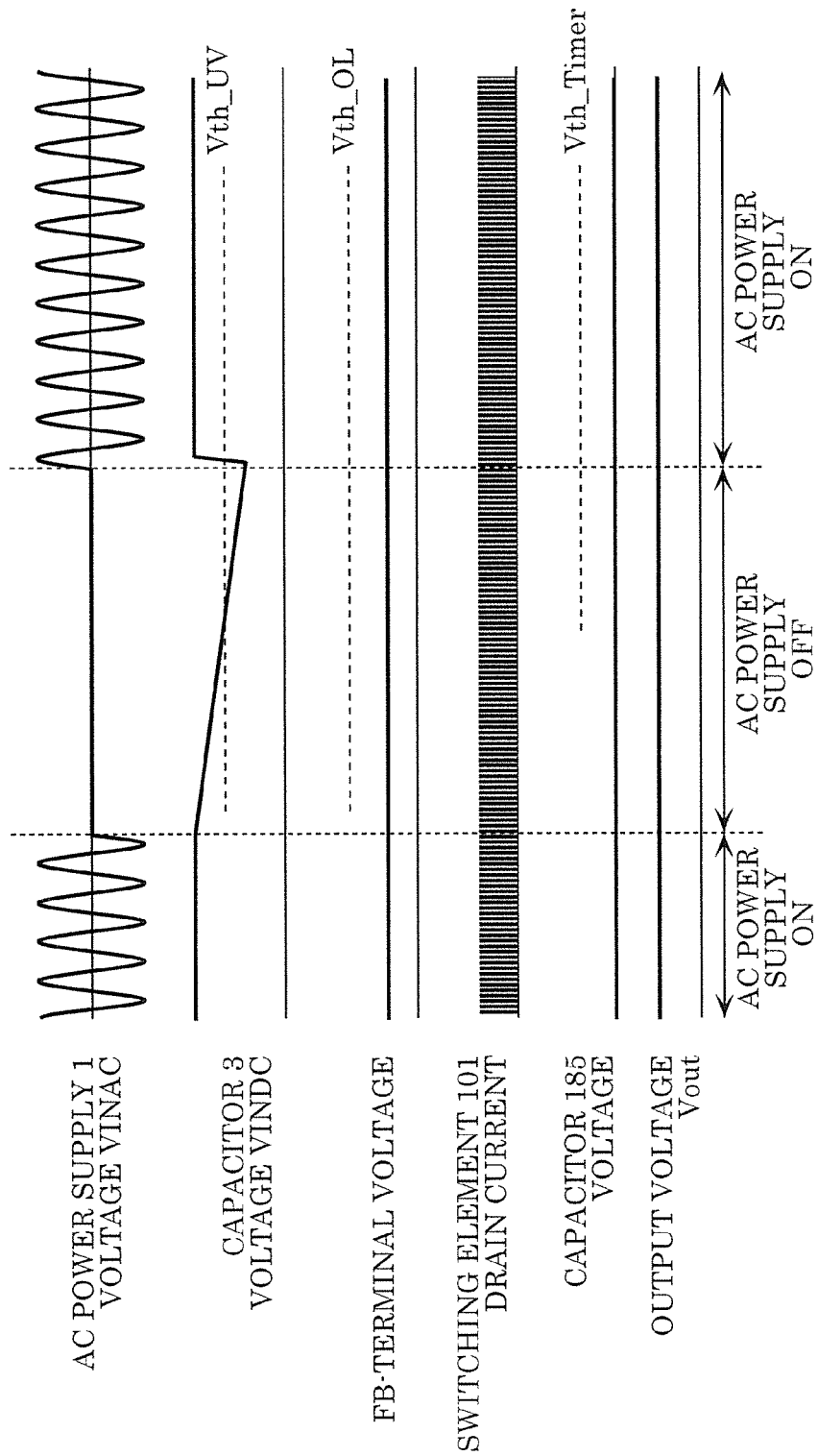
FIG. 6 is a timing diagram illustrating a case where overload protection function is not activated during an instantaneous drop in the switching power supply device according to Embodiment 1.

Next, an operation to be performed when the load is lighter than that illustrated in FIG. 5 will be described with reference to a timing diagram illustrated in FIG. 6.

Although input DC voltage VINDC decreases when AC power supply 1 is turned off, the overload state does not occur because the load is lighter than the energy that can be supplied, so that the switching operation is continued and output voltage Vout is maintained. If the switching operation is continued until AC power supply 1 is returned, power can be continuously supplied to the electronic device connected to the load, without lowering output voltage Vout even during an instantaneous drop.

As described above, in the switching power supply device according to Embodiment 1, even when AC power supply 1 is turned off and the overload protection function is activated, the overload protection interruption period is extended until AC power supply 1 is returned and input DC voltage VINDC becomes higher than threshold voltage Vth_UV. Accordingly, an unnecessary return that causes a malfunction in the electronic device can be avoided. In addition, since the switching operation can be resumed when input DC voltage VINDC is higher than threshold voltage Vth_UV, the problem that the return of the switching power supply device of the related art as illustrated in FIG. 20 is delayed can be solved.

Further, even when input DC voltage VINDC decreases due to an instantaneous drop or the like, the switching operation is continued if the size of the load is small enough to prevent the overload protection function from being activated. Accordingly, the problem that the output voltage decreases during an instantaneous drop of the switching power supply device including the input low-voltage detection circuit of the related art as illustrated in FIG. 21 can be solved. Further, since the switching operation is not interrupted until the overload protection function is activated when the AC power supply is turned off, electric charges are less likely to remain in smoothing capacitor 3, which is highly convenient for maintenance and the like. In addition, input low voltage detection signal VIN_UV is used only to release the overload protection function. Accordingly, even when the input low voltage is detected during the normal operation, this has no adverse effect on the switching operation. Consequently, there is no need to prevent erroneous detection by, for example, providing a long delay time for a ripple voltage or switching noise in the input DC voltage due to the switching operation, and an increase in cost can be suppressed.

Reference voltage source 112 of low-voltage detection circuit 110 may have a hysteresis. In this case, the overload protection function is less likely to be activated during re-activation because input DC voltage VINDC is high during the returning operation, and thus the returning operation can be performed smoothly.

Threshold voltage Vth_UV may be set so that the input low voltage can be detected before AC power supply 1 is turned off and the overload protection function is activated, and thus an unnecessary return during the OFF state of AC power supply 1 can be reliably avoided.

In a case where the input low voltage detection function is not required, a disabling threshold voltage that is lower than threshold voltage Vth_UV may be provided so as to disable the input low voltage detection function by causing a short-circuit between the LS terminal and the GND terminal. In a case where the input low voltage detection function is required, in order to prevent the input low voltage detection function from being disabled even when AC power supply 1 is turned off and input DC voltage VINDC falls below the disabling threshold voltage, a provision may made to prevent the input low voltage detection function from being disabled once input DC voltage VINDC becomes higher than the disabling threshold voltage, even when input DC voltage VINDC subsequently falls below the disabling threshold voltage.

In addition, return delay circuit 180 may set a predetermined delay time by using a component connected to the outside of switching control circuit 100, such as smoothing capacitor 15 connected to the VCC terminal.

Further, since feedback signal indicating the load state is generated and input to switching control circuit 100, output state detection circuit 7 and photocoupler 8 are provided. However, the feedback signal may be generated by detecting the feedback signal from auxiliary winding 4c or the rectified and smoothed VCC-terminal voltage, instead of detecting the feedback signal from secondary-side output voltage Vout.

Although the configuration of the flyback-type switching power supply device has been described above, configurations with different topologies, such as forward-type and step-down-chopper-type switching power supply devices may also be used.

Variation of Embodiment 1

A variation of the switching power supply device according to Embodiment 1 will be described with reference to FIG. 7. The switching power supply device according to a variation of Embodiment 1 is substantially the same as the switching power supply device according to Embodiment 1. The switching power supply device according to a variation of Embodiment 1 differs from the switching power supply device according to Embodiment 1 in regard to the connection of the LS terminal of switching control circuit 100.

Figure 7:
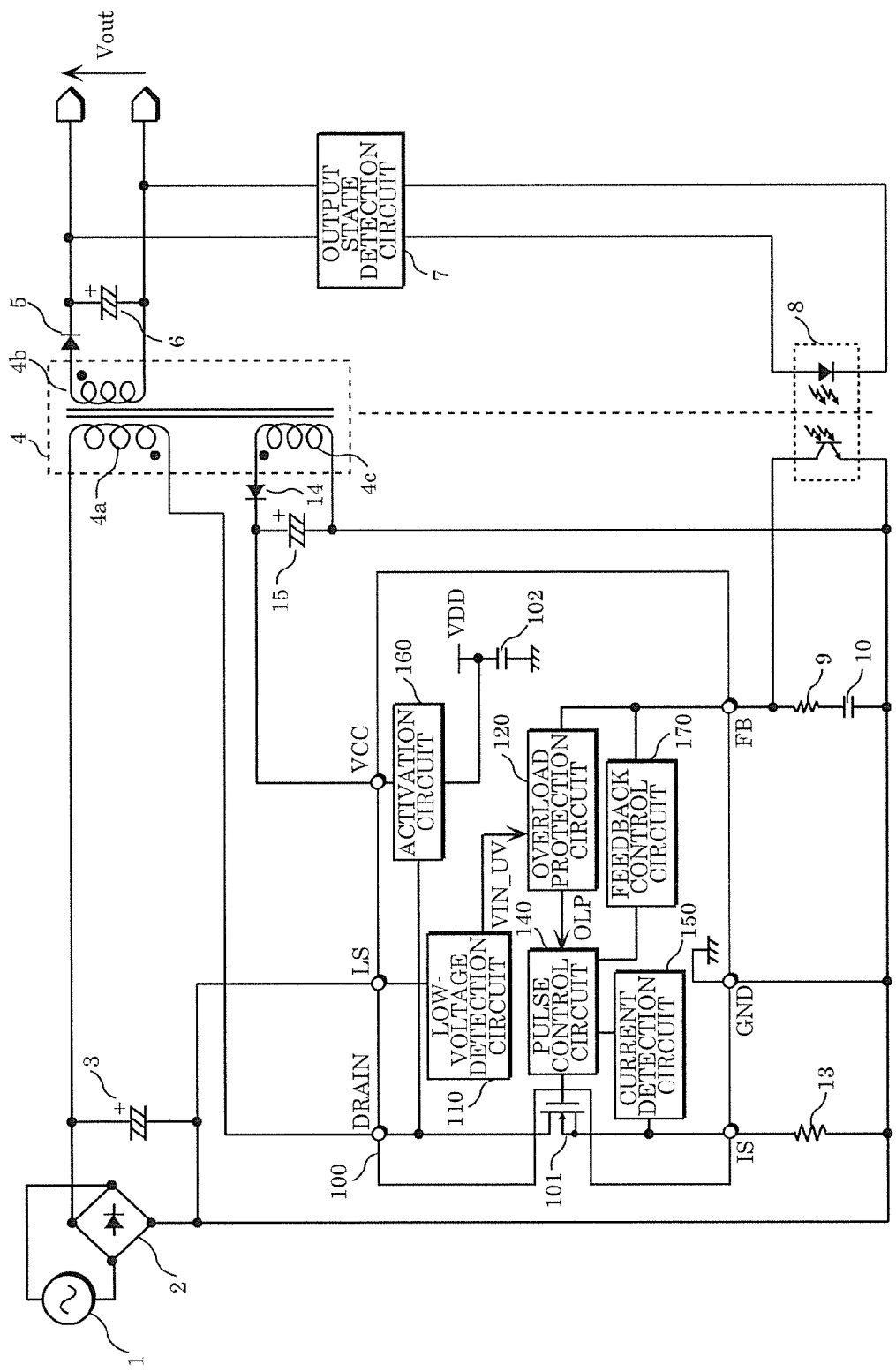
FIG. 7 is a circuit diagram illustrating a configuration example of a switching power supply device according to a variation of Embodiment 1.

In Embodiment 1, the LS terminal of switching control circuit 100 is connected to input voltage detection resistors 11 and 12 and receives a voltage that is proportional to input DC voltage VINDC, while the LS terminal of the switching power supply device according to the variation illustrated in FIG. 7 is connected to the GND terminal.

Since the LS-terminal voltage is fixed to 0 V, input low voltage detection signal VIN_UV is constantly in the inactive state at the low level. Specifically, the low-level signal is constantly input to the reset terminal of RS flip-flop circuit 126 of overload protection circuit 120a, and once the overload protection function is activated, the overload protection function cannot be released. Therefore, in the returning operation after the overload protection operation, RS flip-flop circuit 126 needs to be initialized by lowering the VCC-terminal voltage or VDD voltage, which is the power supply voltage for switching control circuit 100, and thus the switching power supply device according to the variation can be regarded as the latch-type overload protection function.

As described above, the switching power supply device according to the variation is capable of providing the latch-type overload protection function using switching control circuit 100 including self-reset-type overload protection circuit 120a. Thus, since two overload protection functions can be selected by a single switching control circuit 100, the degree of freedom of design of the switching power supply device is improved.

Embodiment 2

Next, a switching power supply device and a semiconductor device according to Embodiment 2 will be described with reference to FIGS. 8 and 9.

In Embodiment 1, the delay time set by return delay circuit 180 in overload protection circuit 120a is constant regardless of the input low voltage detection state. In Embodiment 2, the switching power supply device in which the delay time varies depending on the input low voltage detection state will be described. Repeated descriptions of components that are identical to the components in Embodiment 1 are omitted.

Figure 8:
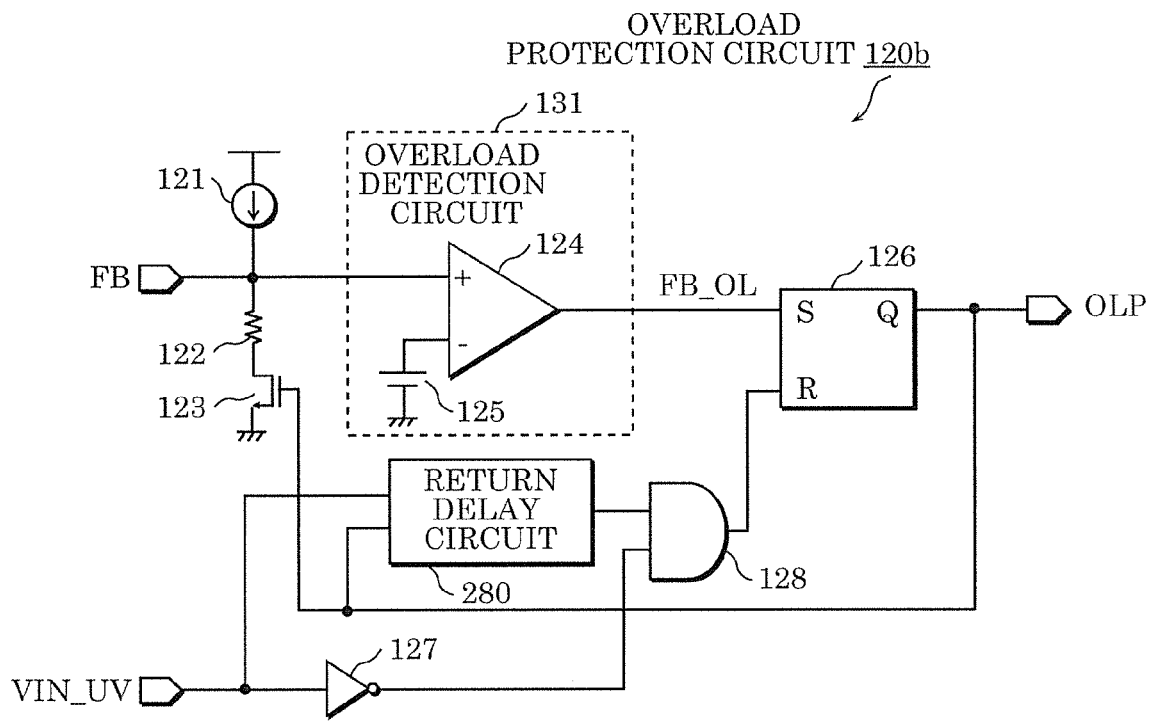
FIG. 8 is a circuit diagram illustrating a configuration of an overload protection circuit according to Embodiment 2.
Figure 9:
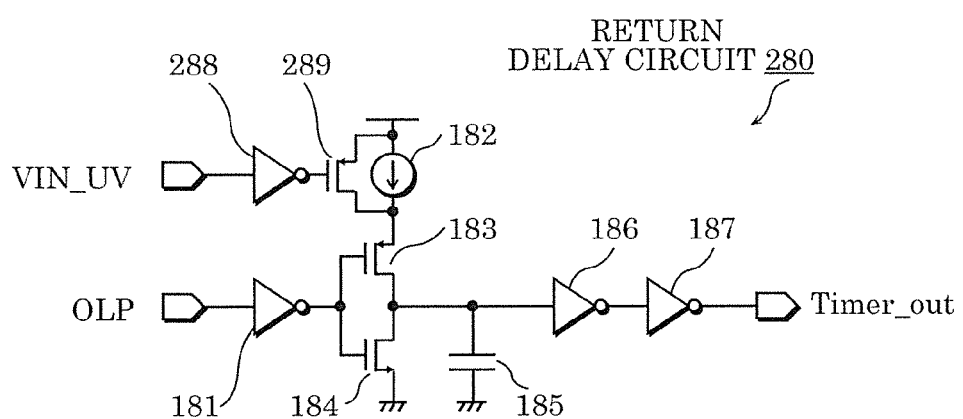
FIG. 9 is a circuit diagram illustrating a configuration of a return delay circuit according to Embodiment 2.

FIG. 8 is a circuit diagram illustrating overload protection circuit 120b as a configuration example of overload protection circuit 120 in the switching power supply device according to Embodiment 2. Overload protection circuit 120 according to Embodiment 2 differs from overload protection circuit 120a according to Embodiment 1 illustrated in FIG. 3 in regard to return delay circuit 280 and the connection of return delay circuit 280. Return delay circuit 280 receives not only overload protection signal OLP, but also input low voltage detection signal VIN_UV. FIG. 9 is a circuit diagram illustrating a configuration example of return delay circuit 280 in the switching power supply device according to Embodiment 2. Return delay circuit 280 according to Embodiment 2 differs from return delay circuit 180 according to Embodiment 1 illustrated in FIG. 4 in that input low voltage detection signal VIN_UV, which is an input signal, inverter circuit 288, and P-type MOSFET 289 are added.

As for the operation of each of the switching power supply device and the semiconductor device according to Embodiment 2 having a configuration as described above, the overload protection function different from Embodiment 1 will be mainly described.

When the input voltage is normal after the overload protection function is activated, like in Embodiment 1, overload protection signal OLP is inverted to the low level and deactivated after a lapse of a predetermined delay time set by constant current source 182, capacitor 185, and threshold voltage Vth_Timer that causes inversion of the output from inverter circuit 186 in return delay circuit 280, and the overload protection operation is terminated.

On the other hand, when the AC power supply is turned off and input low voltage detection signal VIN_UV is placed in the active state, i.e., the high level, P-type MOSFET 289 is rendered conductive and a voltage increase rate of capacitor 185 is extremely high, so that the delay time is extremely short. Accordingly, delay signal Timer_out is inverted to the high level immediately after the overload protection operation, and the overload protection operation is terminated immediately after input low voltage detection signal VIN_UV is inverted to the low level and deactivated.

As described above, like in Embodiment 1, the switching power supply device according to Embodiment 2 can perform an appropriate overload protection operation also when the power supply is interrupted, and when an instantaneous drop (including instantaneous interruption and instantaneous stop) during which an input voltage drops for a short period of time occurs. Further, since the delay time varies depending on the input low voltage detection state, even when the overload protection function is activated due to an instantaneous drop or the like, the overload protection function is released immediately after the AC power supply is returned, and thus a delay in returning of the switching power supply device can be reduced.

A charge current for capacitor 185 is switched by input low voltage detection signal VIN_UV, but instead the delay time may be set to zero in the input low voltage detection state by switching between connection and non-connection of capacitor 185.

Embodiment 3

Next, a switching power supply device and a semiconductor device according to Embodiment 3 will be described with reference to FIG. 10.

While Embodiment 1 illustrates the switching power supply device including self-reset-type overload protection circuit 120, Embodiment 3 illustrates a switching power supply device including latch-type overload protection circuit 120. Repeated descriptions of components that are identical to the components in Embodiment 1 are omitted.

Figure 10:
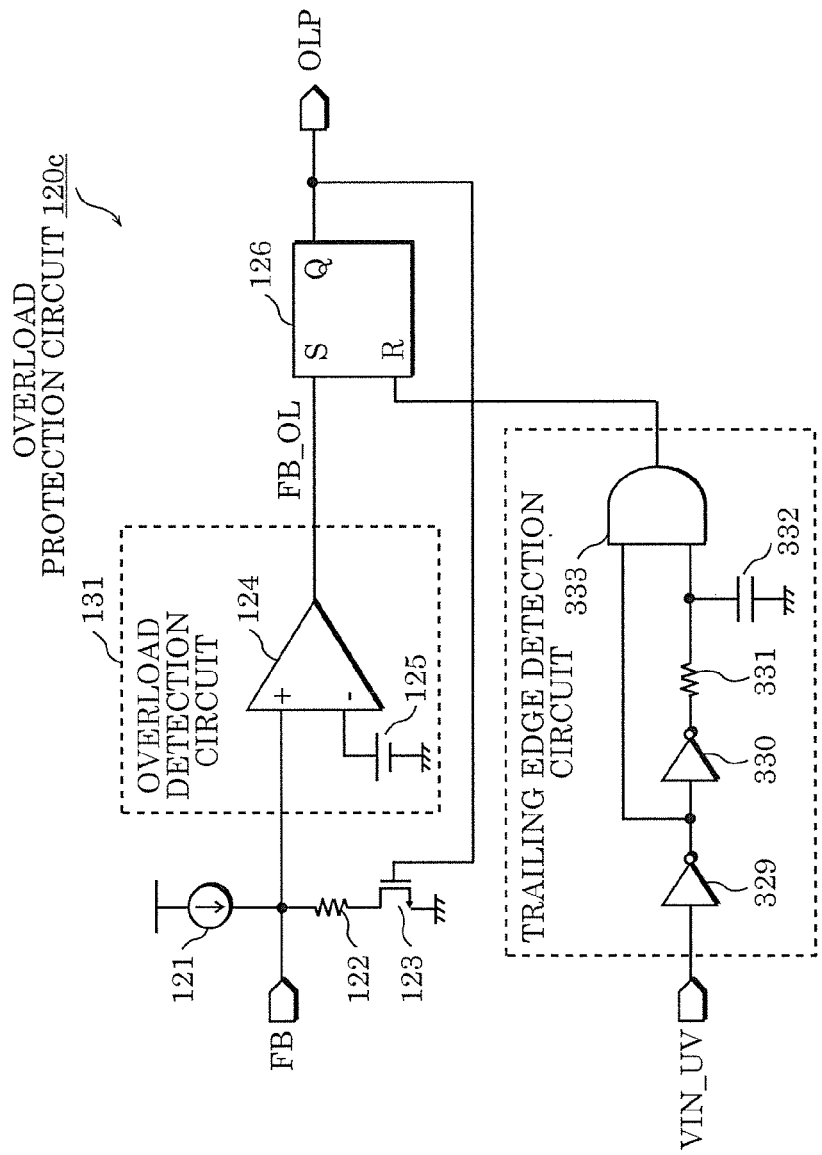
FIG. 10 is a circuit diagram illustrating a configuration of an overload protection circuit according to Embodiment 3.

FIG. 10 is a circuit diagram illustrating overload protection circuit 120c as a configuration example of overload protection circuit 120 in the switching power supply device according to Embodiment 3. Overload protection circuit 120 according to Embodiment 3 differs from overload protection circuit 120a according to Embodiment 1 illustrated in FIG. 3 in that a trailing edge detection circuit is connected to the reset terminal of RS flip-flop circuit 126. The trailing edge detection circuit receives input low voltage detection signal VIN_UV, and includes inverter circuits 329 and 330, resistor 331, capacitor 332, and AND circuit 333.

As for the operation of each of the switching power supply device and the semiconductor device according to Embodiment 3 having a configuration as described above, the overload protection function different from Embodiment 1 will be mainly described.

When the input voltage is normal, input low voltage detection signal VIN_UV is maintained in the inactive state, i.e., the low level. Accordingly, once the overload protection function is activated, the low-level signal is constantly input to the reset terminal of RS flip-flop circuit 126 of overload protection circuit 120c, and the overload protection operation is held. To release the overload protection function, RS flip-flop circuit 126 needs to be initialized by lowering the VCC-terminal voltage or VDD voltage, which is the power supply voltage for switching control circuit 100, and thus the latch-type overload protection operation is activated.

On the other hand, when the AC power supply is turned off and input low voltage detection signal VIN_UV is inverted to the high level and activated, the output from each of inverter circuits 329 and 330 is inverted and capacitor 332 is charged through resistor 331. After that, when the AC power supply is returned and input low voltage detection signal VIN_UV is inverted to the low level and deactivated, the high-level signal is temporarily output from AND circuit 333 while capacitor 332 is discharged, and a reset signal having a pulse waveform is input to RS flip-flop circuit 126. Accordingly, when input low voltage detection signal VIN_UV is deactivated and a trailing edge from the high level to the low level is detected, overload protection signal OLP is inverted to the low level and deactivated, so that the overload protection operation is terminated.

As described above, in the switching power supply device according to Embodiment 3, the latch-type overload protection function is released when input low voltage detection signal VIN_UV is placed in the inactive state from the active state. Therefore, even when the overload protection function is activated due to an instantaneous drop or the like, it is possible to prevent the problem that the overload protection function is released immediately after the AC power supply is returned and the switching power supply device cannot be returned.

Embodiment 4

Next, a switching power supply device and a semiconductor device according to Embodiment 4 will be described with reference to FIGS. 11 and 12.

While Embodiment 1 illustrates the switching power supply device including low-voltage detection circuit 110 that detects a decrease in input DC voltage VINDC, Embodiment 4 illustrates an switching power supply device including low-voltage detection circuit 410 that detects a decrease in AC voltage VINAC of AC power supply 1. Repeated descriptions of components that are identical to the components in Embodiment 1 are omitted.

Figure 11:
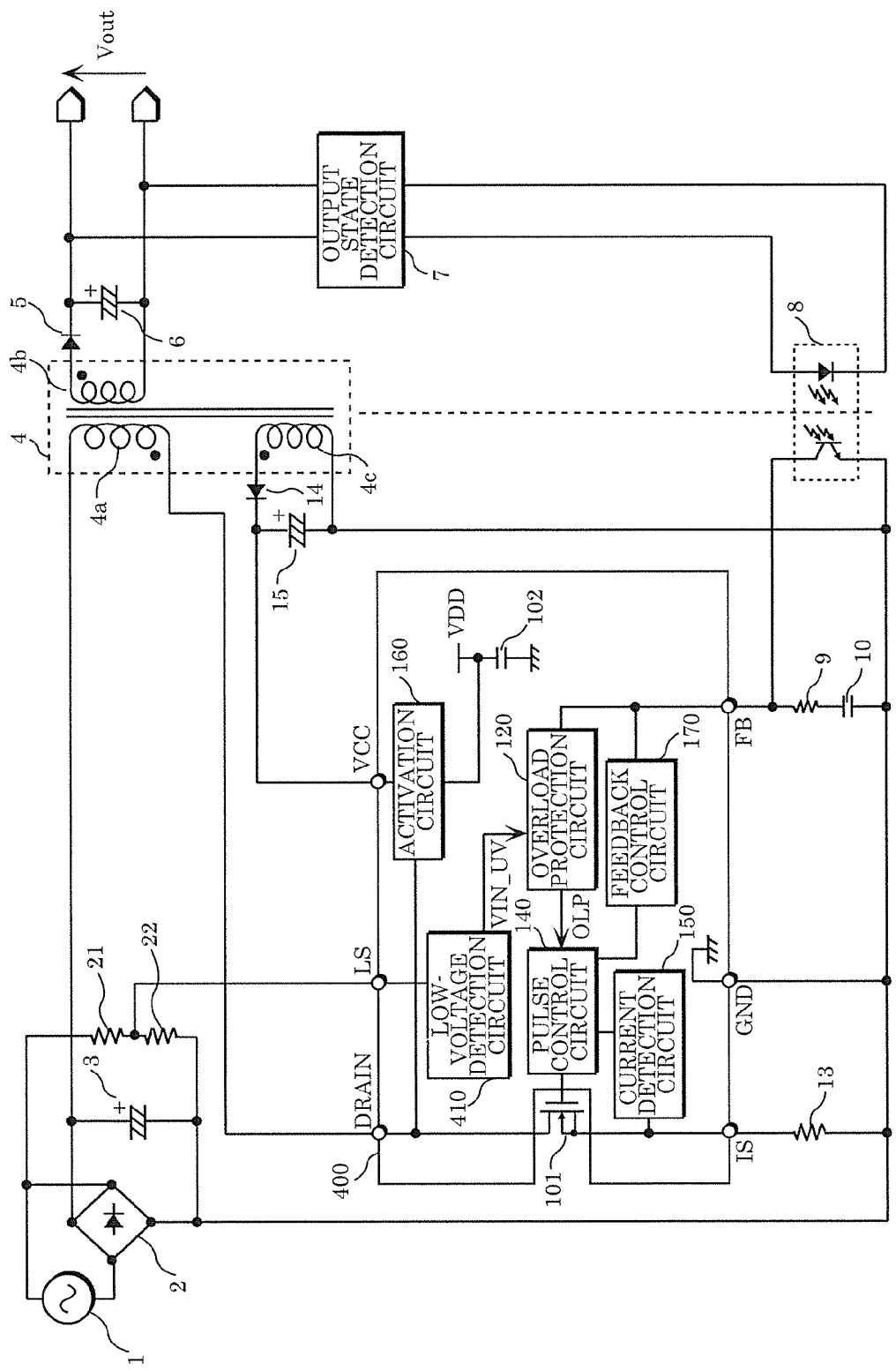
FIG. 11 is a circuit diagram illustrating a configuration example of a switching power supply device according to Embodiment 4.
Figure 12:
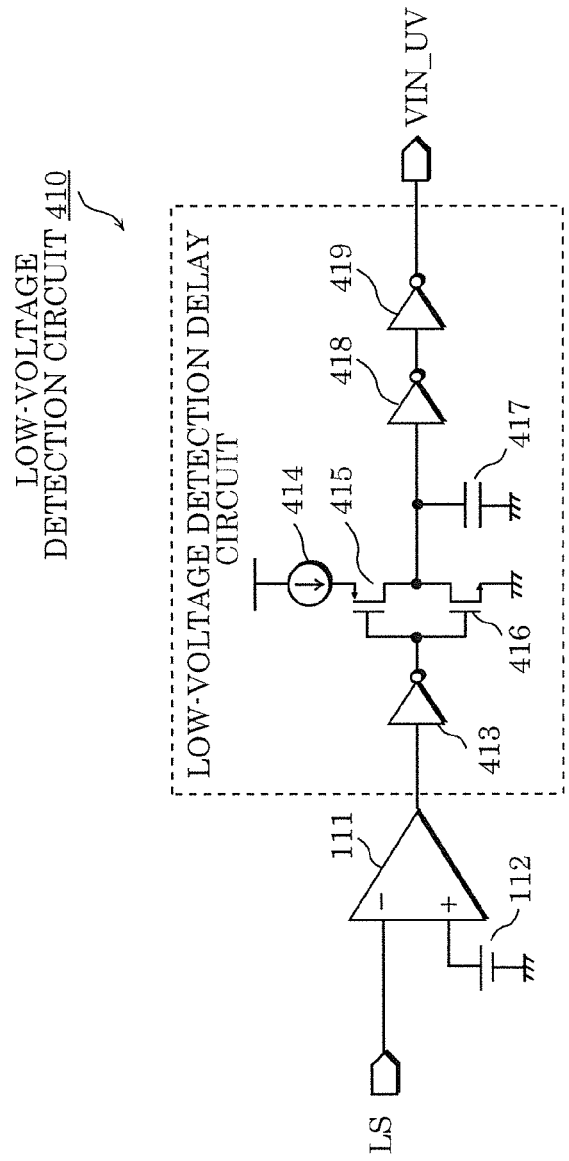
FIG. 12 is a circuit diagram illustrating a configuration of a low-voltage detection circuit according to Embodiment 4.

FIG. 11 is a circuit diagram illustrating a configuration example of the switching power supply device according to Embodiment 4. The switching power supply device according to Embodiment 4 differs from the switching power supply device according to Embodiment 1 illustrated in FIG. 1 in regard to input voltage detection resistors 21 and 22, and low-voltage detection circuit 410 in switching control circuit 400. Resistor 21 is connected to AC power supply 1. A half-wave rectifying voltage obtained in such a manner that bridge diode 2 performs half-wave rectification on the AC voltage from AC power supply 1 is applied to each of resistors 21 and 22. The half-wave rectifying voltage divided by resistors 21 and 22 is input to the LS terminal of switching control circuit 400. FIG. 12 is a circuit diagram illustrating a configuration example of low-voltage detection circuit 410 according to Embodiment 4. Low-voltage detection circuit 410 according to Embodiment 4 differs from low-voltage detection circuit 110 according to Embodiment 1 illustrated in FIG. 2 in that a low voltage detection delay circuit is added. The low voltage detection delay circuit includes inverter circuits 413, 418, and 419, constant current source 414, P-type MOSFET 415, N-type MOSFET 416, and capacitor 417.

Low-voltage detection circuit 410 and resistors 21 and 22 provide an input low-voltage detection circuit that generates input low voltage detection signal VIN_UV to be activated when the AC voltage is a voltage having a voltage value lower than a predetermined value.

As for the operation of each of the switching power supply device and the semiconductor device according to Embodiment 4 having a configuration as described above, the input low voltage detection function different from Embodiment 1 will be mainly described.

To detect a decrease in AC voltage VINAC of AC power supply 1, the half-wave rectifying voltage is input to the LS terminal of switching control circuit 400, and during a period in which the voltage is lower than threshold voltage Vth_UV set by reference voltage source 112, the high-level signal is output from comparator 111. In the normal operation, the high-level period of output signal from comparator 111 is shorter than the cycle (e.g., 20 ms in the AC power supply with a frequency of 50 Hz) of AC power supply 1. Accordingly, if the constant current of constant current source 414 and the low-voltage detection delay time (e.g., 20 ms) set by capacitor 417 are set to be equal to or longer than the cycle of AC power supply 1, input low voltage detection signal VIN_UV is maintained in the inactive state.

On the other hand, as AC voltage VINAC decreases when, for example, AC power supply 1 is turned off, the high-level period of the output signal from comparator 111 is longer than a low-voltage detection delay time, so that input low voltage detection signal VIN_UV is inverted to the high level and activated. Accordingly, the provision of the low voltage detection delay circuit makes it possible to detect a decrease in AC voltage VINAC of AC power supply 1 without causing erroneous detection.

As described above, like in Embodiment 1, the switching power supply device according to Embodiment 4 can perform an appropriate overload protection operation also when the power supply is interrupted, and when an instantaneous drop (including instantaneous interruption and instantaneous stop) during which an input voltage drops for a short period of time occurs. Further, since the half-wave rectifying voltage is applied to input voltage detection resistors 21 and 22, the power consumption can be reduced as compared with a case where input DC voltage VINDC is applied. Furthermore, since the OFF state of AC power supply 1 can be detected more quickly than when the input voltage is detected from input DC voltage VINDC, so that the problem with the switching power supply device of the related art can be solved more reliably.

Embodiment 5

Next, a switching power supply device and a semiconductor device according to Embodiment 5 will be described with reference to FIGS. 13 and 14.

Embodiment 1 illustrates the switching power supply device in which switching control circuit 100 is provided with the LS terminal as a terminal dedicated to detecting an input voltage so as to detect a decrease in input DC voltage VINDC. On the other hand, Embodiment 5 illustrates a switching power supply device in which a terminal dedicated to detecting an input voltage is not provided. Repeated descriptions of components that are identical to the components in Embodiment 1 are omitted.

Figure 13:
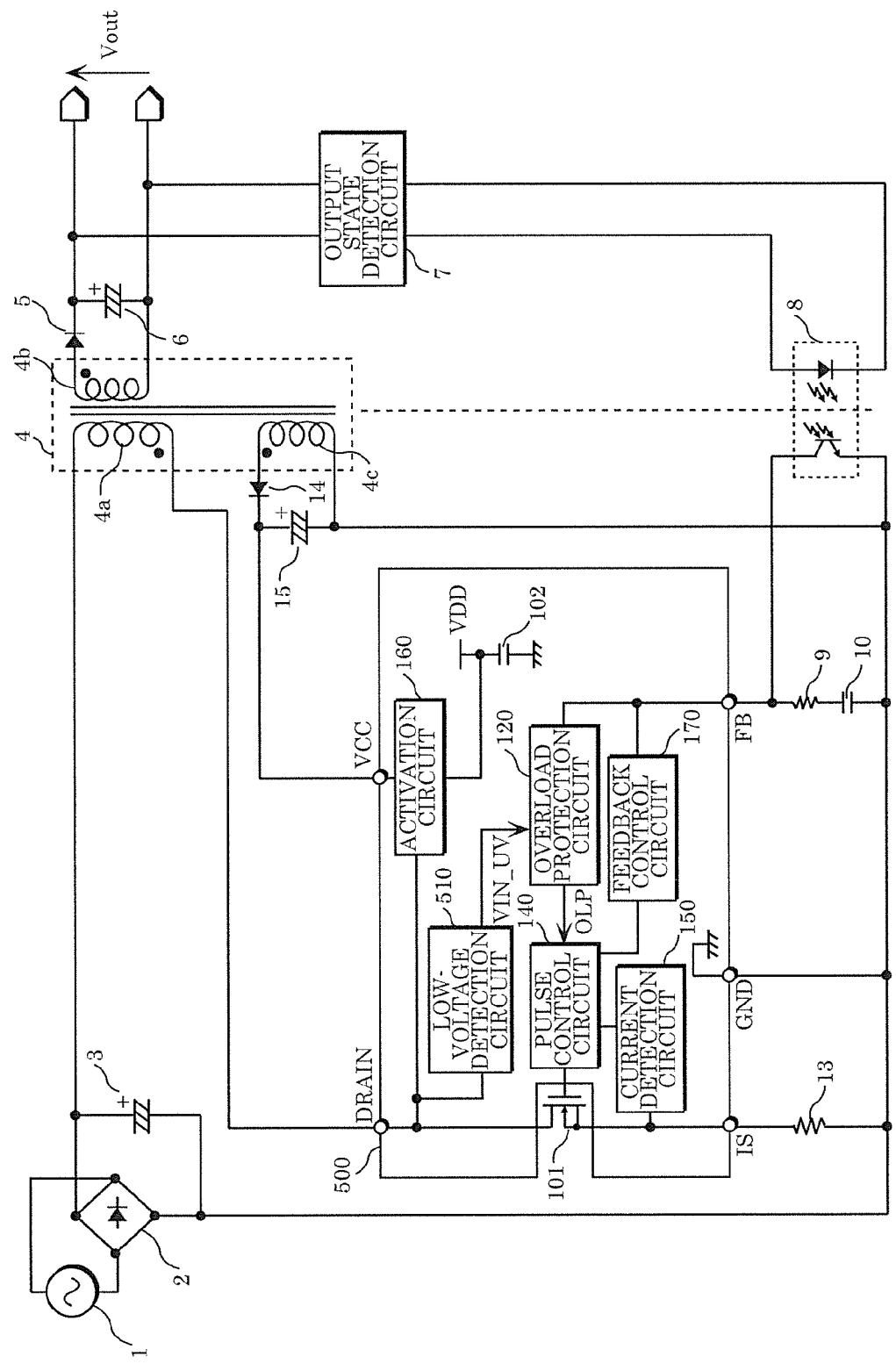
FIG. 13 is a circuit diagram illustrating a configuration example of a switching power supply device according to Embodiment 5.
Figure 14:
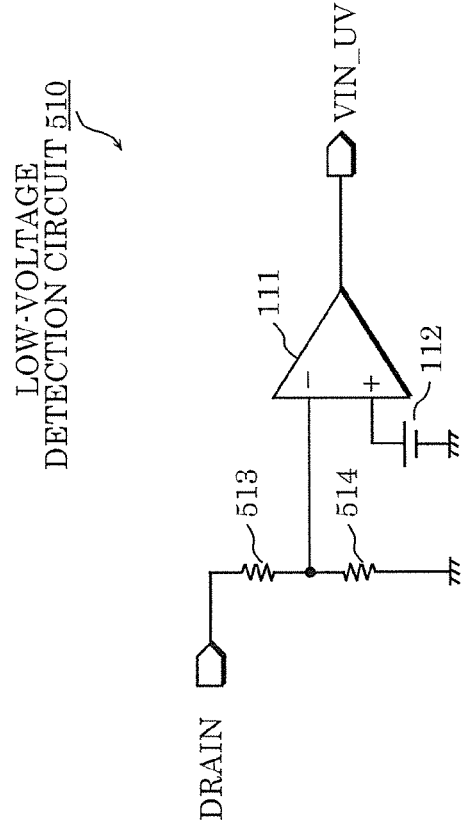
FIG. 14 is a circuit diagram illustrating a configuration of a low-voltage detection circuit according to Embodiment 5.

FIG. 13 is a circuit diagram illustrating a configuration example of the switching power supply device according to Embodiment 5. The switching power supply device according to Embodiment 5 differs from the switching power supply device according to Embodiment 1 illustrated in FIG. 1 in that low-voltage detection circuit 510 of switching control circuit 500 is connected to the DRAIN terminal. FIG. 14 is a circuit diagram illustrating a configuration example of low-voltage detection circuit 510 according to Embodiment 5. Unlike in low-voltage detection circuit 110 according to Embodiment 1 illustrated in FIG. 2, the DRAIN-terminal voltage is input instead of the LS-terminal voltage, and input voltage detection resistors 513 and 514 are each connected to comparator 111.

Low-voltage detection circuit 510 provides an input low-voltage detection circuit that generates input low voltage detection signal VIN_UV to be activated when the AC voltage is a voltage having a voltage value lower than a predetermined value.

As for the operation of each of the switching power supply device and the semiconductor device according to Embodiment 5 having a configuration as described above, the input low voltage detection function different from Embodiment 1 will be mainly described.

When the overload protection function is not activated and switching element 101 performs the switching operation, the DRAIN-terminal voltage decreases during a period in which switching element 101 is rendered conductive. Accordingly, input low voltage detection signal VIN_UV may become the high level and thus is disabled in overload protection circuit 120.

When the overload protection function is activated, the switching operation of switching element 101 is interrupted, and input DC voltage VINDC is applied to the DRAIN terminal through primary winding 4a of transformer 4. Consequently, input DC voltage VINDC can be monitored accurately and stably also at the DRAIN terminal.

When the input voltage is normal, input low voltage detection signal VIN_UV is maintained in the inactive state during the overload protection operation. Accordingly, the high-level signal is constantly input to AND circuit 128 of overload protection circuit 120a, and the timing for releasing the overload protection function is determined by delay signal Timer_out from return delay circuit 180.

On the other hand, when the AC power supply is turned off and the voltage obtained in such a manner that the DRAIN-terminal voltage, i.e., input DC voltage VINDC, is divided by resistors 513 and 514 for input detection during the overload protection operation is lower than threshold voltage Vth_UV set by reference voltage source 112, input low voltage detection signal VIN_UV is inverted to the high level and activated. Thus, since the output from AND circuit 128 of overload protection circuit 120a is maintained at the low level, RS flip-flop circuit 126 is not reset. Accordingly, overload protection signal OLP is maintained in the active state, and the overload protection interruption period is extended until input low voltage detection signal VIN_UV is inverted to the low level and deactivated.

When AC power supply 1 is returned, input DC voltage VINDC increases and input low voltage detection signal VIN_UV is inverted to the low level and deactivated. The reset signal is input to RS flip-flop circuit 126 and overload protection signal OLP is inverted to the low level and deactivated, so that the FB-terminal voltage increases and the switching operation is resumed.

As described above, like in Embodiment 1, the switching power supply device according to Embodiment 5 can perform an appropriate overload protection operation also when the power supply is interrupted, and when an instantaneous drop (including instantaneous interruption and instantaneous stop) during which an input voltage drops for a short period of time occurs. Further, the use of the DRAIN terminal for input low voltage detection makes it possible to eliminate the terminal dedicated to detecting the input voltage.

A high-voltage element equivalent to switching element 101 is required for resistor 513 of low-voltage detection circuit 510 connected to the DRAIN terminal. Alternatively, a high-voltage junction transistor (JFET) may be disposed between the DRAIN terminal and resistor 513, and a low-voltage element may be used as resistor 513. The JFET may also be used as a JFET used in another circuit such as activation circuit 160. Any terminal may be used to connect low-voltage detection circuit 510, instead of using the DRAIN terminal, as long as the terminal can detect a decrease in input DC voltage VINDC during the overload protection operation.

Embodiment 6

Next, a switching power supply device and a semiconductor device according to Embodiment 6 will be described with reference to FIGS. 15 and 16.

Embodiment 5 illustrates the switching power supply device that constantly monitors the DRAIN-terminal voltage, while Embodiment 6 illustrates the switching power supply device that monitors the DRAIN-terminal voltage only during the overload protection operation. Repeated descriptions of components that are identical to the components in Embodiment 5 are omitted.

Figure 15:
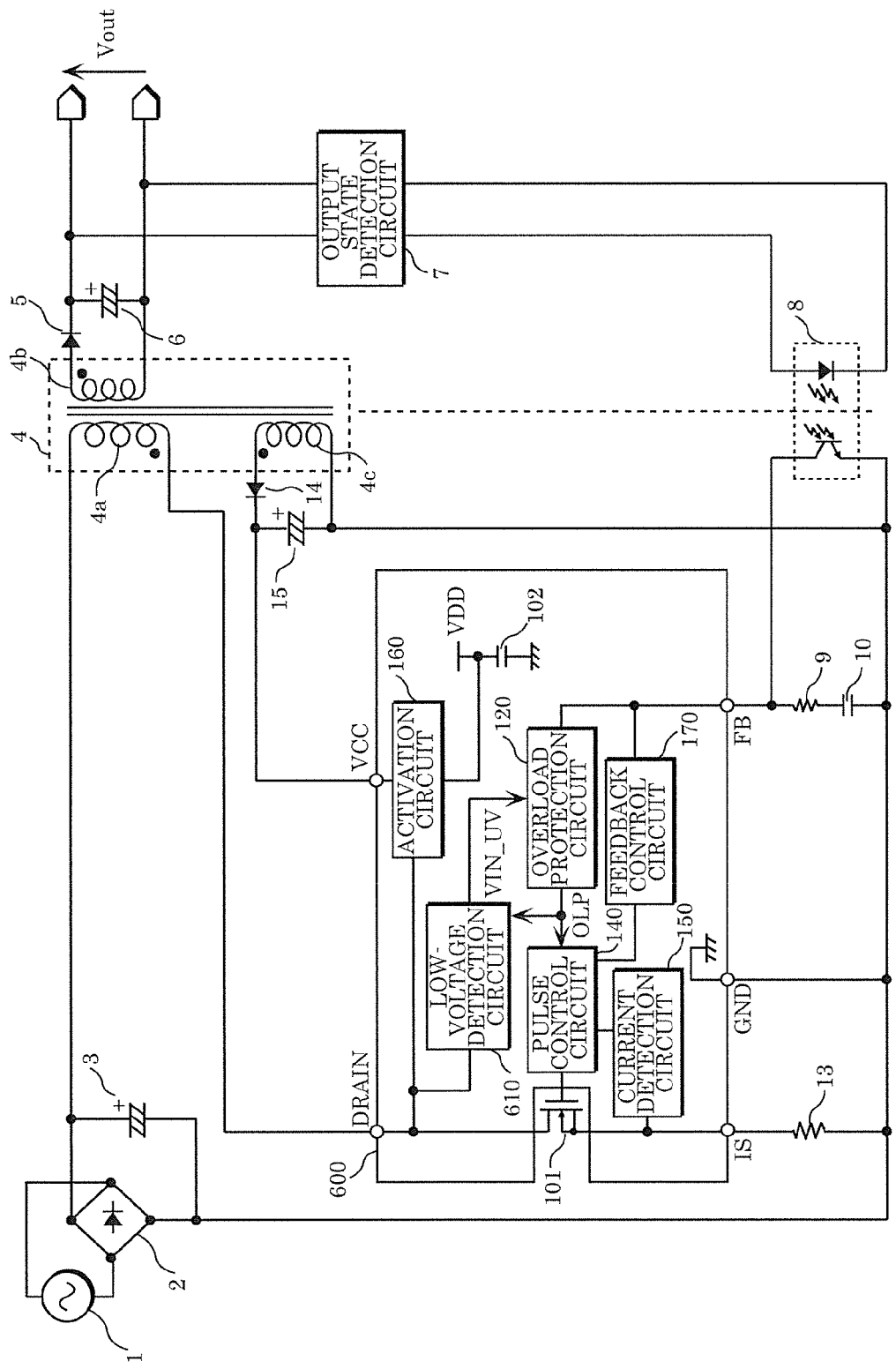
FIG. 15 is a circuit diagram illustrating a configuration example of a switching power supply device according to Embodiment 6.
Figure 16:
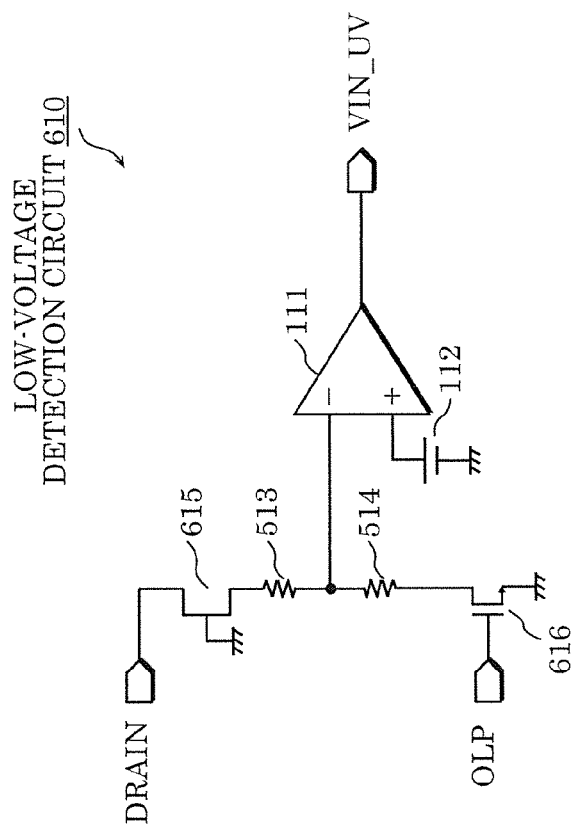
FIG. 16 is a circuit diagram illustrating a configuration of a low-voltage detection circuit according to Embodiment 6.

FIG. 15 is a circuit diagram illustrating a configuration example of the switching power supply device according to Embodiment 6. The switching power supply device according to Embodiment 6 differs from the switching power supply device according to Embodiment 5 illustrated in FIG. 13 in that overload protection signal OLP is input to low-voltage detection circuit 610 of switching control circuit 600. FIG. 16 is a circuit diagram illustrating a configuration example of low-voltage detection circuit 610 according to Embodiment 6. Unlike in low-voltage detection circuit 510 according to Embodiment 5 illustrated in FIG. 14, high-voltage junction transistor (JFET) 615 is disposed between the DRAIN terminal and resistor 513, and N-type MOSFET 616 having a gate to which overload protection signal OLP is input is disposed between resistor 514 and GND.

Low-voltage detection circuit 610 provides an input low-voltage detection circuit that generates input low voltage detection signal VIN_UV to be activated when the AC voltage is a voltage having a voltage value lower than a predetermined value.

As for the operation of each of the switching power supply device and the semiconductor device according to Embodiment 6 having a configuration as described above, the input low voltage detection function different from Embodiment 5 will be mainly described.

When the overload protection function is not activated, overload protection signal OLP is in the inactive state and N-type MOSFET 616 is in a non-conductive state. Accordingly, no current flows through input voltage detection resistors 513 and 514. Therefore, the power consumption during the normal operation can be reduced. Comparator 111 receives the voltage clamped by JFET 615, and thus can be composed of a low-voltage element. Like in the switching power supply device according to Embodiment 5, when switching element 101 performs the switching operation, the DRAIN-terminal voltage decreases during the conductive period of switching element 101. Accordingly, input low voltage detection signal VIN_UV may become the high level and thus is disabled in overload protection circuit 120.

When the overload protection function is activated, overload protection signal OLP is placed in the active state and N-type MOSFET 616 is placed in the conductive state, so that a current flows through input voltage detection resistors 513 and 514. The voltage that is stepped down from the DRAIN-terminal voltage by JFET 615 and is then divided by resistors 513 and 514 is input to comparator 111. Since the switching operation of switching element 101 is interrupted, input DC voltage VINDC is applied to the DRAIN terminal through primary winding 4a of transformer 4. Consequently, input DC voltage VINDC can be monitored accurately and stably also at the DRAIN terminal.

When the input voltage is normal, input low voltage detection signal VIN_UV is maintained in the inactive state during the overload protection operation. Accordingly, the high-level signal is constantly input to AND circuit 128 of overload protection circuit 120a, and the timing for releasing the overload protection function is determined by delay signal Timer_out from return delay circuit 180.

On the other hand, when the AC power supply is turned off and the voltage obtained in such a manner that the DRAIN-terminal voltage, i.e., input DC voltage VINDC, is divided by resistor 514 and the resistor including JFET 615 and resistor 513 during the overload protection operation is lower than threshold voltage Vth_UV set by reference voltage source 112, input low voltage detection signal VIN_UV is inverted to the high level and activated. Thus, since the output from AND circuit 128 of overload protection circuit 120a is maintained at the low level, RS flip-flop circuit 126 is not reset. Accordingly, overload protection signal OLP is maintained in the active state and the overload protection interruption period is extended until input low voltage detection signal VIN_UV is inverted to the low level and deactivated.

When AC power supply 1 is returned, input DC voltage VINDC increases and input low voltage detection signal VIN_UV is inverted to the low level and deactivated. Since the reset signal is input to RS flip-flop circuit 126 and overload protection signal OLP is inverted to the low level and deactivated, the FB-terminal voltage increases and the switching operation is resumed.

As described above, like in Embodiment 5, in the switching power supply device according to Embodiment 6, the use of the DRAIN terminal for input low voltage detection makes it possible to eliminate the terminal dedicated to detecting the input voltage. Further, since no current is caused to flow to input voltage detection resistors 513 and 514 during the normal operation, the power consumption can be reduced.

A JFET used in another circuit such as activation circuit 160 connected to the DRAIN terminal may also be used as JFET 615 of low-voltage detection circuit 610. Resistor 513 and comparator 111 may be configured using high-voltage elements, and JFET 615 may be omitted.

Embodiments 1 to 6 and variations described above are provided to illustrate techniques according to the present disclosure. For that purpose, the accompanying drawings and detailed description are provided.

Therefore, the accompanying drawings and detailed description provided to illustrate the techniques described above may include constituent elements that are not essential for resolving problems as well as those essential for resolving problems. Thus, these non-essential constituent elements, if they are included in the accompanying drawings or detailed description, should not be regarded as essential constituent elements.

The techniques according to the present disclosure are not limited to the above-described embodiments, and modifications, substitutions, additions, omissions, and the like made on the embodiments as appropriate can also be applied. In addition, various modifications that can be conceived by a person having ordinary skill in the art and modes constructed by combining the constituent elements in a plurality of embodiments can also be included in the technical scope of the present disclosure without departing from the technical scope of the present disclosure.

INDUSTRIAL APPLICABILITY

The present disclosure can be widely applied to power supply devices including an overload protection function.

What is claimed is:

1. A switching power supply device, comprising:
an energy conversion circuit that receives an input voltage; the input voltage being a DC input voltage;
an output rectifying and smoothing circuit that rectifies and smoothes a voltage output from the energy conversion circuit and outputs an output voltage to a load;
a switching element that is connected to the energy conversion circuit and switches the input voltage;
a switching control circuit that controls switching of the switching element; and
an output state detection circuit that generates an output state signal indicating a load state of the load with respect to power output from the energy conversion circuit, wherein
the switching control circuit includes:
an overload detection circuit that receives the output state signal and generates an overload detection signal, the overload detection signal being activated when the load state is an overload state;
an overload protection circuit that generates an overload protection signal in response to activation of the overload detection signal, the overload protection signal being activated when a switching operation of the switching element is interrupted; and
an input low-voltage detection circuit that generates an input low voltage detection signal, the input low voltage detection signal being activated when the input voltage has a voltage value lower than a predetermined value,
when the input low voltage detection signal is in an active state and the load state is not in the overload state the overload protection signal maintains an inactive state,
when the load state turns into the overload state due to a decrease in the input voltage, the overload protection signal is activated in response to activation of the overload detection signal, and the overload protection signal is deactivated when the input low voltage detection signal is in an inactive state.

2. The switching power supply device according to claim 1, wherein
the overload protection circuit includes a timer circuit that measures a first time duration,
the overload protection signal is continuously active during the first time duration from the activation of the overload detection signal, and
the overload protection signal is deactivated after a lapse of the first time duration from the activation of the overload detection signal and when the input low voltage detection signal is in the inactive state.

3. The switching power supply device according to claim 2, wherein
when the input low voltage detection signal is activated, the timer circuit changes the first time duration to a second time duration shorter than the first time duration.

4. The switching power supply device according to claim 1, wherein
the overload protection circuit includes a latch circuit that stores an activation state of overload detection signal, and
the latch circuit is set when the overload detection signal is activated, and activates the overload protection signal, and the latch circuit is reset when the input low voltage detection signal is deactivated, and deactivates the overload protection signal.

5. The switching power supply device according to claim 1, wherein
a voltage having a voltage value lower than the predetermined value in the input low-voltage detection circuit is detected based on a voltage at a node between the switching element and the energy conversion circuit.

6. The switching power supply device according to claim 5, wherein
a current consumption in the input low-voltage detection circuit is smaller when the overload protection signal is in an inactive state than when the overload protection signal is in an active state.

7. A semiconductor device for switching control, the semiconductor device comprising:
a semiconductor substrate; and
the switching control circuit in the switching power supply device according to claim 1 disposed as an integrated circuit on the semiconductor substrate.

8. A switching power supply device, comprising:
an input rectifying and smoothing circuit that rectifies and smoothes an AC voltage from an AC power supply, and outputs an input voltage, the input voltage being a DC input voltage;
an energy conversion circuit that receives the input voltage;
an output rectifying and smoothing circuit that rectifies and smoothes a voltage output from the energy conversion circuit, and outputs an output voltage to a load;
a switching element that is connected to the energy conversion circuit and switches the input voltage;
a switching control circuit that controls switching of the switching element; and
an output state detection circuit that generates an output state signal indicating a load state of the load with respect to power output from the energy conversion circuit, wherein
the switching control circuit includes:
an overload detection circuit that receives the output state signal and generates an overload detection signal, the overload detection signal being activated when the load state is an overload state;
an overload protection circuit that generates an overload protection signal in response to activation of the overload detection signal, the overload protection signal being activated when a switching operation of the switching element is interrupted; and
an input low-voltage detection circuit that generates an input low voltage detection signal, the input low voltage detection signal being activated when the AC voltage has a voltage value lower than a predetermined value,
when the input low voltage detection signal is in an active state and the load state is not in the overload state, the overload protection signal maintains an inactive state,
when the load state turns into the overload state due to a decrease in the input voltage, the overload protection signal is activated in response to activation of the overload detection signal, and
the overload protection signal is deactivated when the input low voltage detection signal is in an inactive state.

9. The switching power supply device according to claim 8, wherein
the overload protection circuit includes a timer circuit that measures a first time duration,
the overload protection signal is continuously active during the first time duration from the activation of the overload detection signal, and
the overload protection signal is deactivated after a lapse of the first time duration from the activation of the overload detection signal and when the input low voltage detection signal is in the inactive state.

10. The switching power supply device according to claim 9, wherein
when the input low voltage detection signal is activated, the timer circuit changes the first time duration to a second time duration shorter than the first time duration.

11. The switching power supply device according to claim 8, wherein
the overload protection circuit includes a latch circuit that stores an activation state of the overload detection signal, and
the latch circuit is set when the overload detection signal is activated, and activates the overload protection signal, and the latch circuit is reset when the input low voltage detection signal is deactivated, and deactivates the overload protection signal.

12. The switching power supply device according to claim 8, wherein
a voltage having a voltage value lower than the predetermined value in the input low-voltage detection circuit is detected based on a voltage at a node between the switching element and the energy conversion circuit.

13. The switching power supply device according to claim 12, wherein
a current consumption in the input low-voltage detection circuit is smaller when the overload protection signal is in the inactive state than when the overload protection signal is in an active state.

14. A semiconductor device for switching control, the semiconductor device comprising:
a semiconductor substrate; and the switching control circuit in the switching power supply device according to claim 8 disposed as an integrated circuit on the semiconductor substrate.

* * * * *